United States Patent [19]
Desai et al.

[11] Patent Number: 5,347,638
[45] Date of Patent: Sep. 13, 1994

[54] METHOD AND APPARATUS FOR RELOADING MICROINSTRUCTION CODE TO A SCSI SEQUENCER

[75] Inventors: Dhlrubwai N. Desai, Santa Clara County; David M. Lewis, Santa Cruz County; Don M. Robinson, Santa Clara County, all of Calif.

[73] Assignee: Seagate Technology, Inc., Scotts Valley, Calif.

[21] Appl. No.: 686,112

[22] Filed: Apr. 15, 1991

[51] Int. Cl.$^5$ ............................................. G06F 9/24
[52] U.S. Cl. .............................. 395/375; 364/DIG. 1; 364/230; 364/230.1; 364/230.3; 364/232.8
[58] Field of Search ................... 364/DIG. 1 MS File, 364/DIG. 2 MS File; 395/250, 275, 425, 375, 650, 800

[56] References Cited

U.S. PATENT DOCUMENTS 5,081,609 1/1992 Getson, Jr. et al. ................. 395/425
5,101,490 3/1992 Getson, Jr. et al. ................. 395/425

OTHER PUBLICATIONS

"Turbo Pascal Version 3.0 Reference Manual Chapter 18 Overlay System." by Borland International, Inc. 4585 Scotts Valley Drive Scotts Valley, Calif. 95066 (1985) (pp. 149–157).

Primary Examiner—Robert B. Harrell
Attorney, Agent, or Firm—Flehr, Hohbach, Test, Albritton & Herbert

[57] ABSTRACT

Connected blocks of micro-instructions are reloaded to a register file in a sequencer, which is used for controlling an interfacing between a host computer, a magnetic disk-drive, and a buffer memory. This provides for efficiently reloading sequencer microinstructions into a relatively small sequencer-memory space and minimizes use of external system resources for reloading microinstructions. This avoids the sequencer having to remain in a wait condition until a system processor completes higher priority tasks and becomes available for reloading instructions to memory cells of the sequencer.

The method includes storing a plurality of blocks of microinstructions in a buffer memory device. A first block of microinstructions is stored in a register file. A second block of microinstructions stored within the buffer memory device is called using microinstructions contained within the first block of microinstructions. The second block of microinstructions are loaded into the register file, where the second block of microinstruction contain microinstructions for loading a third block of microinstructions into the register file, and so on.

The sequencer interfaces with a buffer memory, which stores a plurality of blocks of microinstructions. A register file stores a first block of microinstructions, where the first block of microinstructions includes microinstructions for selecting a second block of microinstructions from the buffer memory. The first block of microinstruction includes microinstructions for subsequently loading the selected second block of microinstructions into the register file.

15 Claims, 7 Drawing Sheets

METHOD AND APPARATUS FOR RELOADING MICROINSTRUCTION CODE TO A SCSI SEQUENCER

BACKGROUND OF THE INVENTION

1. Field of the Invention

This invention relates to sequencers which provide a series of microinstructions for control of electronic circuits and, more particularly to apparatus and methods for efficiently operating a Small Computer Systems Interface SCSI sequencer with a hard-disk magnetic storage device and a host computer system.

2. Prior Art

Two specific methods have been used to implement interface control operations. First is a microprocessor which controlled interface operations by setting or resetting interface control lines. These control lines determined the direction and identified the type of information being transferred over the interface. This type of interface control was flexible as the program controller. The microprocessor and instructions could be easily changed, as it was stored in RAM or PROM. This method had performance issues associated with it, as microprocessor overhead caused significant delays in controlling the interface.

A second method was to design a hardware state machine to control interface control lines. This method had advantages in speed but was not flexible as new interface sequences required the state machine to be modified. Because of the difficulty in describing complex interface sequences, the state machines are designed to handle simple well-defined tasks, and require assistance from a "local" microprocessor to complete most I/O operations.

A further difficulty with present hardwired sequencers is that the SCSI interface standard is periodically changed. When it is, a controller with a hardwired sequencer cannot be used to implement the new standard, and a new controller must be designed. Further, a disc drive controller implements a plurality of basic operations, many of which may be repeated or periodically returned to, depending on the circumstances of the transmission. For example, after RESET, the next phase is BUS FREE, followed by SELECTION and MESSAGE. However, after SELECTION, there may be a return to BUS FREE, and MESSAGE may loop on itself a number of times for a plurality of MESSAGES or returned to BUS FREE, or continue on to COMMAND and TRANSFER. Each of these next phases may also return to MESSAGE and then to BUS FREE. With a hardwired sequencer, only a limited number of options is available without starting the sequence over or causing an interrupt by the microprocessor external to the disc controller to implement the desired sequence. Therefore, a controller implemented with a sequencer having a programmable register file which obtains sequences of instructions, either from an external memory or, in the case of instructions being modified from another external source, is highly desirable.

SUMMARY OF THE INVENTION

It is the object of this invention to provide a special programmable sequencer with decision making capability to control an I/O interface. This provides the high speed of hardware state machines and the flexibility of an external microprocessor over the control of an I/O interface.

It is another object of this invention to minimize the amount of RAM used by the sequencer. Therefore, a method of automatically reloading microinstructions into the sequencer has been provided.

It is another object of this invention to minimize the number of microinstructions to perform the I/O operation. Therefore, a special WAIT instruction has been provided to transfer data using a single instruction.

It is another object of the invention to provide a sequencer arrangement which efficiently provides for reloading of sequencer microinstructions into a relatively small sequencer-memory space.

It is another object of the invention to minimize use of external system resources for reloading microinstructions in a sequencer.

It is another object of the invention to avoid having a sequencer remain in a wait condition until a system processor completes higher priority tasks and becomes available for reloading instructions to the memory cells of the sequencer.

The invention is advantageously used in a sequencer which provides an interface between a magnetic disk-drive, a host computer, and a buffer memory.

In accordance with these and other objects of the invention, an apparatus is provided comprising a sequencer incorporated in a SCSI interface dedicated to controlling SCSI interface operations. In a preferred embodiment, an apparatus and a method are provided for reloading blocks of micro-instructions to a register file in a sequencer where the sequencer controls interfacing between a host computer and a magnetic disk-drive.

The preferred loading method includes storing a plurality of blocks of microinstructions in a buffer memory device. A first block of microinstructions is loaded in a register file. A second block of microinstructions, which is stored within the buffer memory device, is called using microinstructions contained within the first block of microinstructions. Instructions in the first block have decision making ability to determine which block will be called. The second block of microinstructions are loaded into the register file, where the second block of microinstruction contain microinstructions for loading a third block of microinstructions into the register file, and so on.

The method includes the step of feeding microinstruction from the output terminals of the register file to one or more control registers in the sequencer.

Either the microinstructions from the output terminals of the register file or the input microinstructions to the sequence from an external microprocessor can be selectively directed with a multiplexer to one or more of the control registers in the interface device.

The method includes the step of selectively directing with a multiplexer either the microinstructions from the buffer memory or microinstructions from an external source of microinstructions to the input terminals of the register file. The external source includes an external processor which selectively provides microinstructions to the register to modify the sequence of operations in the interface sequencer.

The method may include the step of loading a write pointer address for the register file into a write-pointer address register.

The method includes the step of temporarily storing the second block of microinstructions in a FIFO register prior to the second block of microinstructions being loaded into the register file from the buffer memory device.

The method may further include the step of selectively directing data/command with a multiplexer to the FIFO register from either the buffer memory or a host computer data input bus.

The method may also include the step of storing in a data input register the microinstructions from the host computer data input bus.

The method may also include the step of selectively directing output signals from the FIFO or the output signals from a sequencer control register to a host computer data output bus.

The sequencer includes one or more control registers to which are fed control information from the output terminals of the register file. A first multiplexing means is provided for selectively directing to one or more of said control registers either the control information from the output terminals of the register file or the input control information to the register file.

The sequencer includes a second multiplexing means for selectively directing to the input terminals of the register file either the microinstructions from the buffer memory or microinstructions from an external processor.

The sequencer may also include third multiplexer means for selectively directing to the said FIFO register data from either the buffer memory or a host computer data input bus.

The sequencer may also include data input register means for storing information from the host computer data input bus.

The sequencer may further include a third multiplexer means for selectively directing output signals from the FIFO or the output signals from a sequencer control register to a host computer data output bus.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
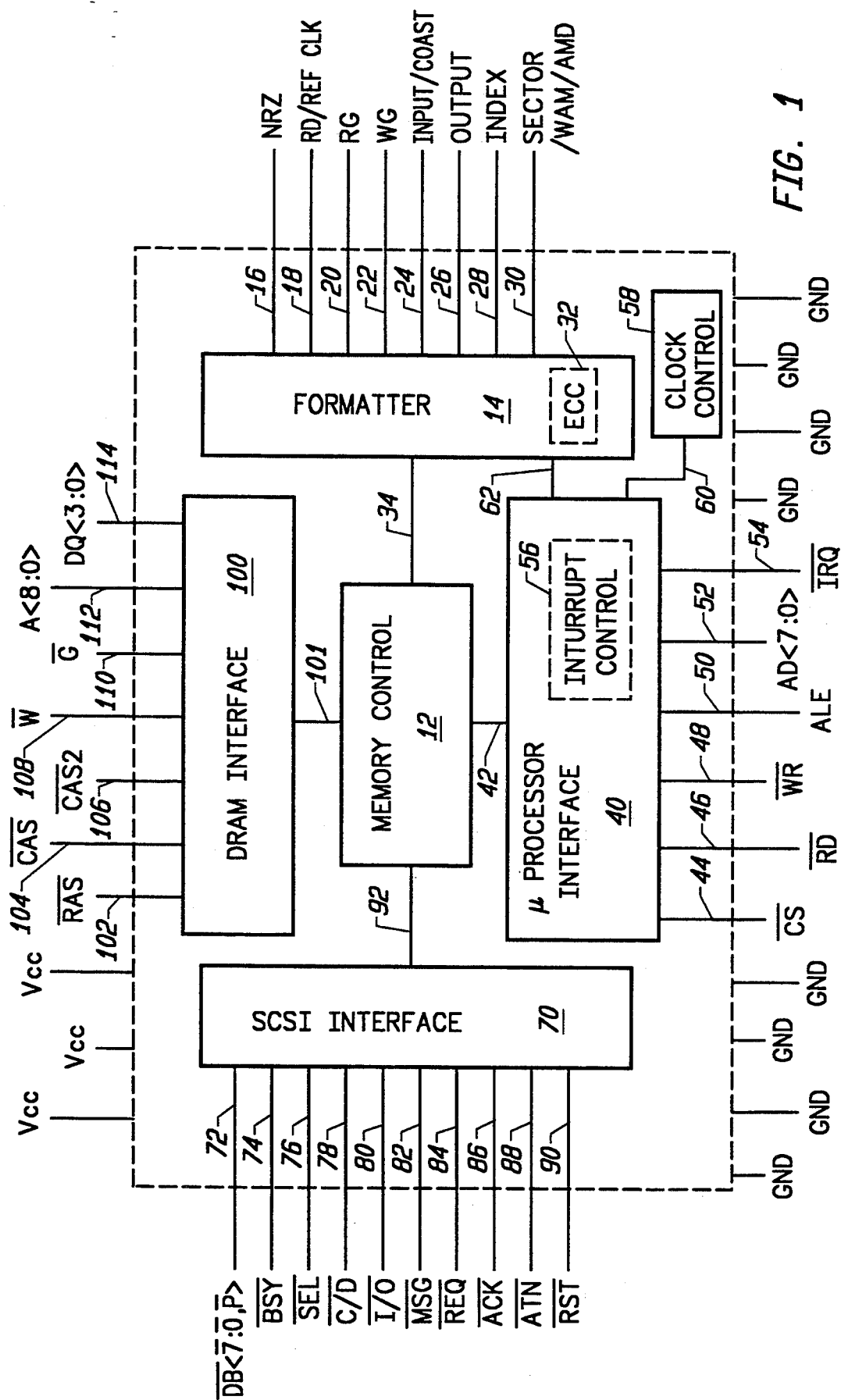
FIG. 1 is an overall functional block diagram of an integrated-circuit SCSI controller, which is controlled by an external microcomputer and which includes circuits for interfacing with a SCSI host, a DRAM buffer memory, and a hard disk magnetic storage device.

FIG. 1 shows a block diagram of a 68-pin integrated circuit small computer system interface SCSI CONTROLLER CIRCUIT 10. As shown in the diagram, various interface blocks are connected by signal buses to a memory control unit 12. A disk-formatter block 14 provides an interface to a magnetic storage disc through various signal lines 16–30. An NRZ signal provided on signal line 16 is an input/output signal in an NRZ data format which provides a data bit stream to or from the logic circuits in the formatter 14. A RD/REF CLK signal on line 18 is a read reference clock which is the clock signal for the formatter supplied by the data separator of the magnetic disc electronics. The frequency of this clock signal ranges from 5 Mhz to 24 Mhz. A read gate signal RG on signal line 20 is a signal which enables the read channel and which causes the controller circuit 10 to input NRZ data to the magnetic disc. A write gate signal WG is a signal which enables the write drivers and which causes the controller circuit 10 to output NZ data to the magnetic disc. An INPUT/COAST signal on line 24 and an OUTPUT signal on line 26 are signals which are general purpose signals used to synchronize the formatter 14 with external magnetic-disk hardware. An INDEX signal provided in line 8 is the index signal from the magnetic disc drive and is supplied once per revolution of the disc. A SECTOR/WAM/AMD signal provided on signal line 30 is a sector input, address mark detected input, or write address mark output to or from the formatter 14, depending on the operating mode of the system. The formatter 14 also contains an error correction code circuit ECC 32. Signals passing between the memory control unit 12 and the formatter 14 are carried on a signal bus 34.

Interfacing between the memory control unit 12 and an external microprocessor, such as an 8051 Intel Controller, is handled with a microprocessor interface circuit 40 which communicates with the memory control circuit 12 through a bus 42. An active-low chip-select CS signal on signal line 44 enables the controller integrated circuit 10 for either a read operation or a write operation. An active-low read-data RD signal on a signal line 46, in conjunction with the CS signal, causes data from a specified register within the memory control circuit 12 to be moved to a microprocessor address- /data AD(7:0) bus 52, as indicated. The microprocessor address/data bus AD(7:0) is an input/output bus with active-high signals provided on bidirectional signal lines which interface to a multiplexed microprocessor address/data bus of the external microprocessor. An active-low write data signal WR on a signal line 48 in connection with the CS signal on signal line 44 causes data from the data bus AD to be moved to a specified register within the memory control unit 12. An interrupt request signal IRQ, provided on a signal line 54, is an active-low output signal from the microprocessor interface interrupt control circuit 56 to interrupt operation of the external microprocessor. A clock control circuit 58 within the integrated circuit 10 provides appropriate clock signals to a clock bus 60 to the microprocessor interface circuit 40. Signals from the microprocessor interface circuit 40 to the formatter 14 are provided on a bus 62.

A SCSI interface circuit 70 provides for communication between a SCSI bus, which includes signal lines 72–90, and the memory control unit 12. Providing the SCSI interface with its own sequence is a special advantage of the present design. It is especially significant that the SCSI sequencer includes a register file (FIG. 3) which may be selectively reloaded with sets of microinstructions as each new operation is begun. In the interface 70, the active-low input/output signal lines in DB(7:0) are the SCSI data lines. An active-low input/output busy SCSI control signal BSY is provided on a signal line 74. An active-low input/output SCSI SEL control signal is provided on a signal line 76. An active-low input/output command/data SCSI control signal C/D is provided on a signal line 78. An active-low input/output message SCSI control signal MSG is provided on signal line 82. An active-low input/output request signal REQ in connection with an acknowledge active-low input/output signal ACK on line 86 forms a SCSI data transfer handshake. An active-low input/output SCSI attention control signal ATN is provided on signal line 88. An active-low input/output SCSI reset signal RST is provided on a signal line 90. All of the above SCSI control signals are provided in accordance with the SCSI standards. The SCSI interface circuit 70 is coupled to the memory control circuit 12 through a signal bus 92.

A DRAM interface buffer memory circuit 100 is coupled to the memory control circuit 12 through a signal bus 101. External connections from the DRAM interface circuit 100 to a DRAM memory are provided through various signal lines. An active-low output row address strobe signal RAS on a signal line 102 provides an address strobe for the DRAM memory. An active-low input/output column address strobe signal CAS on a signal line 104 provides an address strobe for a first or an only DRAM. A second active-low output column address strobe CAS2 signal on a signal line 106 provides an address strobe for a second DRAM. An active-low output right strobe signal W is provided on a signal line 108. An active-low output enable signal G on a signal line 110 is a DRAM output driver enable signal. An address bus 112 provides nine bits of DRAM address A(8:0). Active-high input/output signals are provided on a DRAM data bus DQ(3:0).

Figure 2:
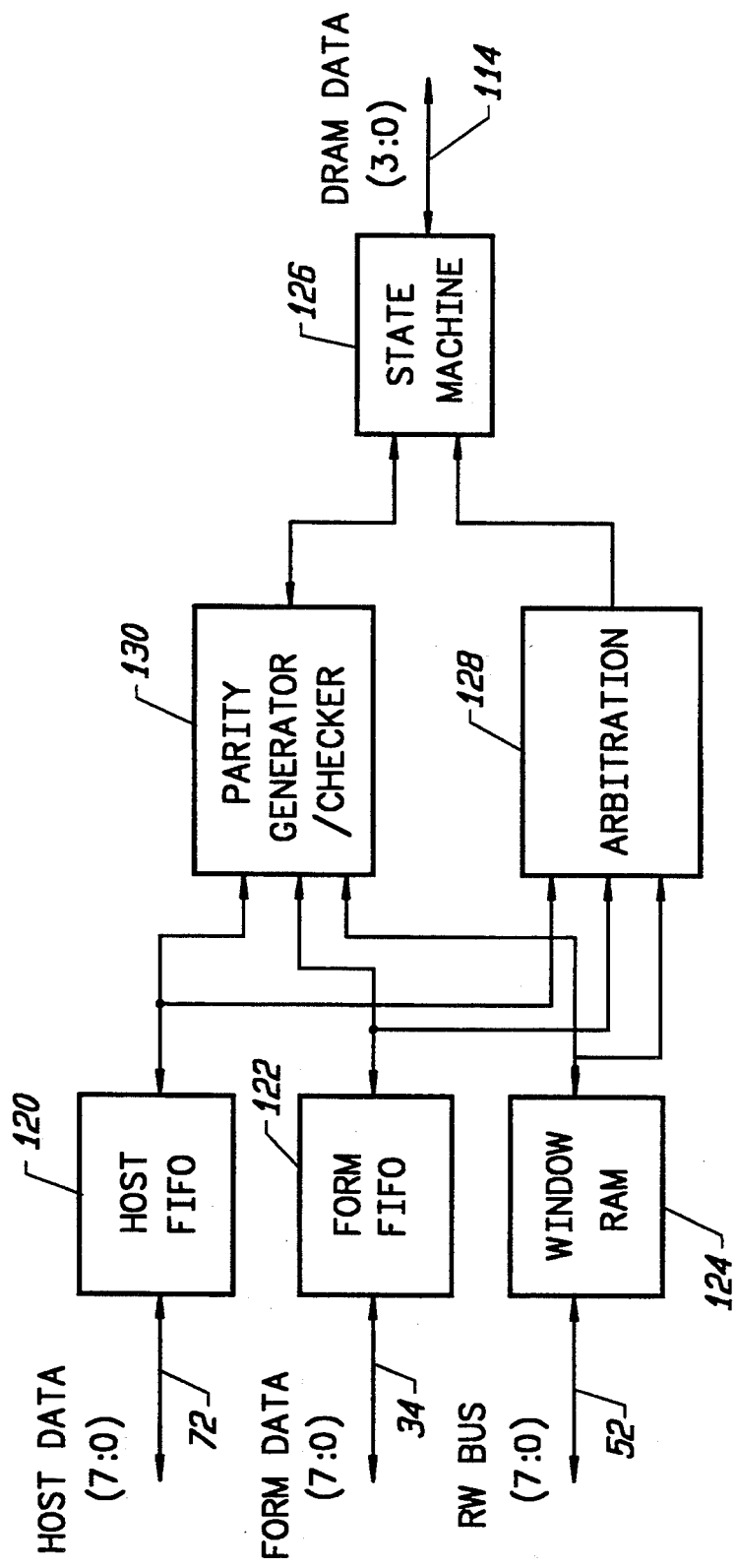
FIG. 2 is a functional block diagram of the buffer memory control portion of the SCSI controller of FIG. 1.

FIG. 2 diagrammatically shows the DRAM memory-interface circuits for the integrated circuit 10. The data is transferred to and from three buses 72,34,52 to the DRAM data bus 114. Data from the SCSI data bus 72, that is, Host data is input to a Host FIFO 120. Formatted disk data from the formatter 14 is input to a Format FIFO 122. Read/write data from the microprocessor on bus 52 is input to a Window RAM 124. Byte/wide (8 bit) data transfers to and from each of these asynchronous interfaces are made to the respective FIFOs. Nibble/wide (4 bit) data transfers are made to and from the DRAM between the respective FIFOs under the control of a State Machine 126.

Several different DRAM configurations can be implemented which include: one 64K×4 DRAM page mode or static column mode; two 64K×DRAM; one 256K×4 DRAM page mode or static column mode; and two 256K×4 DRAMs. The circuit also provides two nibbles of parity for each 32 nibble transfer. Transfers to and from the DRAM are in blocks of 32 nibbles, or 16 bytes. An Arbitration Circuit 128 gives priority for each interface operation to the DRAM. The disc sequencer for the magnetic disc which provides formatted data from the Form FIFO 122 has the highest priority. Refresh of the DRAM buffer memory has the next highest priority. Microprocessor inputs from the read/write bus which is stored in the window ram 124 has the next priority. Finally Host Data on the SCSI bus 72 stored in the Host FIFO 120 has the lowest priority. The Arbitration Circuit 128 arbitrates at the end of each 16 byte transfer and allows only one interface axis to the DRAM at a time. A parity Generator/Checker Circuit 130 provides the two nibbles of parity for each 32 nibble transfer.

Figure 3:
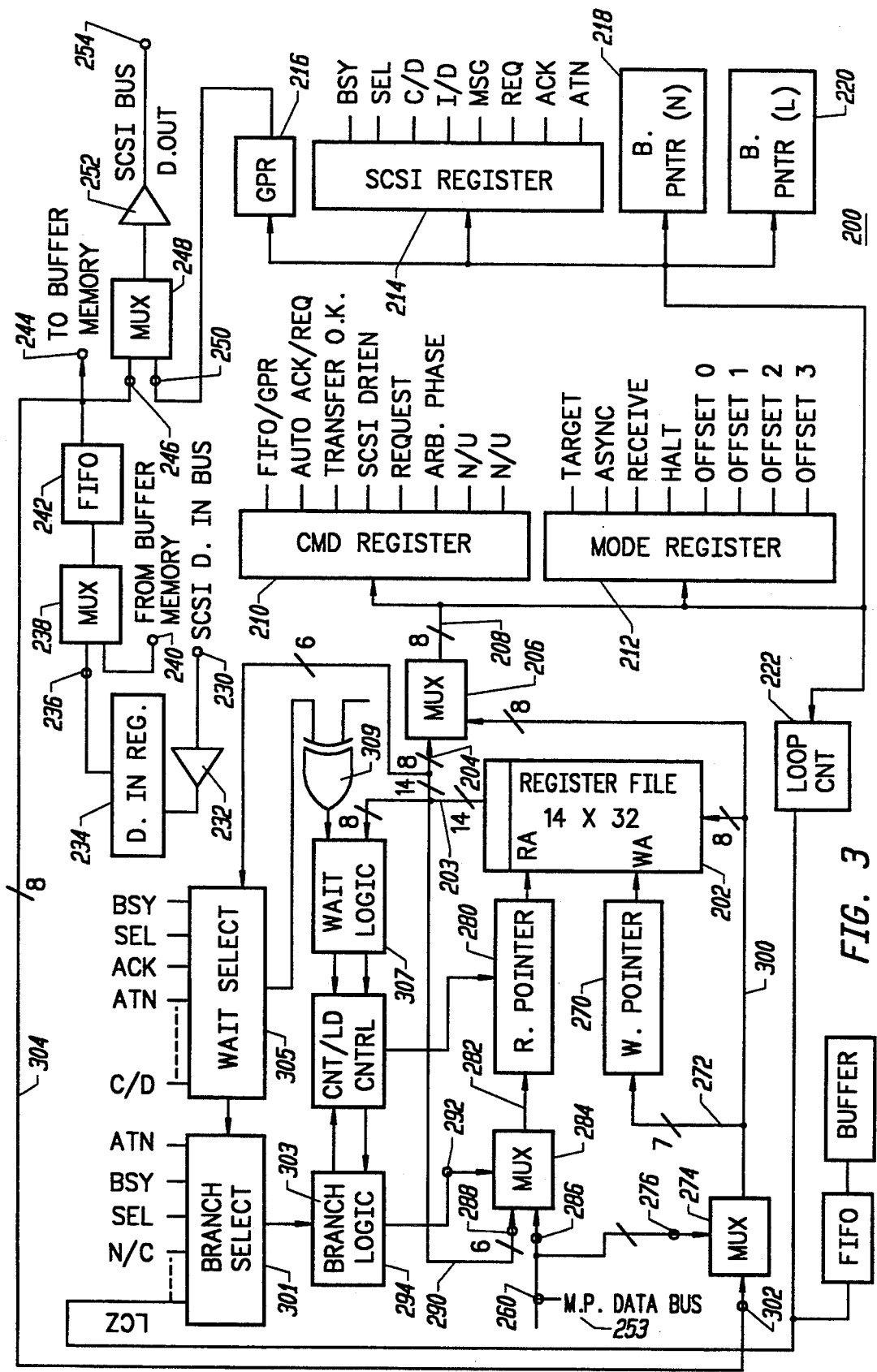
FIG. 3 is a block diagram of a SCSI sequencer circuit which has a register file which can automatically reload itself with various microinstruction modules residing in DRAM buffer memory.

FIG. 3 shows a block diagram of the SCSI sequencer 200 portion of the SCSI interface circuit 70 of FIG. 1.

A 14×32 static-memory register file 202 stores 32 instruction words for the sequencer, where each instructions word has a width of 14 bits. The 14 bits of the instruction word are provided on an output bus 203 from the register file 202. Eight bits of the instructions words stored in the register file 202 are fed on an 8-bit information bus 204 to one set of input terminals of a multiplexer 206.

Various registers are coupled to an 8-bit bus 208 connected to the output of the multiplexer 206. These registers include a SCSI Command Register 210, a SCSI Mode Register 212, a SCSI Bus Control Register 214, a SCSI General Purpose Register 216, a SCSI Buffer Pointer High Register 218, a SCSI Buffer Pointer Low Register 220, and a Loop Counter Register 222.

An input terminal 230 of an input buffer amplifier 232 is connected to a SCSI Data Input Bus. The output terminal of the buffer amplifier 232 is connected to an input terminal of a Data Input Register 234. The output terminal of the Data Input Register 234 is connected to one input terminal 236 of a multiplexer 238. The other input terminal 240 of the multiplexer 238 is connected to the output terminal of a buffer memory, typically a DRAM (not shown which is external to the integrated circuit 10. The output terminal of the multiplexer 238 is coupled to the input terminal of a FIFO memory 242. The output terminal 244 of the FIFO 242 is coupled to the input terminal of the same buffer memory. The output terminal 244 of the FIFO 242 is also connected to one input terminal 246 of a multiplexer 248. The other input terminal 250 of the multiplexer 248 is coupled to a terminal of the General Purpose Register 216. The output terminal 254 of the multiplexer 248 is coupled through a buffer amplifier 252 to a SCSI Data Output Bus.

A microprocessor data bus 253 is coupled to the controller 200 at input terminals 260 for providing address and data information to the data register 202 from an external microprocessor.

Write-address information WA is provided to the register file 202 from a write-pointer register 270. Address information for the write-pointer register 270 is provided on a bus 272 connected to the output terminals of a 2-input multiplexer 274. One set of input terminals 276 of the multiplexer 274 is connected to the microprocessor input terminals 260.

Read-address information RA is provided to the register file 202 from a read-pointer register 280. Address information for the read-pointer register 280 is provided on a bus 282 connected to the output terminals of a 2-input multiplexer 284. One set of input terminals 286 of the multiplexer 284 is connected to the microprocessor input terminals 260. The other set of input terminals 288 is connected to a bus 290 from the output terminals of the register file 202. A selection control terminal 292 of the multiplexer 284 is connected to the output terminal of a branch logic circuit 294, which provides a branch address to the read pointer for a branch instruction.

Data information is provided to the register file 202 on a signal line 300 which is connected to the output terminal of the multiplexer 274. The other set of input terminals 302 for the multiplexer 274 is connected to the output terminal 244 of the FIFO 242 through a bus 304.

Several different sources for a block of 32 instructions for the register file are available. One source for the register file is the microprocessor data bus 253, which is connected to terminal 276 of the multiplexer 274. Two other sources of data information for the register file 202 are coupled to the register file 202 through the FIFO 242. One source of data information is the buffer memory, which is coupled to the multiplexer at terminal 240. The other source of data information is the SCSI Data Input Bus connected to terminals 230 and through buffers 232 to the Data Input Register 234, which is connected to the input terminals 236 for the multiplexer 238. The data information selected by the multiplexer then passes through the FIFO 242 and on signal bus 304 to the input terminal 302 of the multiplexer 274.

Note that data information from the multiplexer 274 on the data bus 300 can be directly transferred to a second set of input terminals of the multiplexer 206, bypassing the register file 202.

The register file is loaded with 32 instructions for the sequencer, where each of the instruction words has a width of 14 bits. The integrated-circuits cells for the register files are preferably static memory cells and, consequently, occupy relatively large silicon area on an integrated circuit. Consequently, to significantly reduce the silicon area of an integrated circuit for the SCSI controller, the size of the register file 202 is reduced by utilizing one of the objects of this invention, for example, from 128 instructions of 14 bits to 32 instructions of 14 bits.

The register file 202 provides a set of instructions for the sequencer. Typically, these instructions are loaded into the register file from an external microprocessor and form what is called an instruction map for the sequencer. For a register file storing only 32 instructions, rather than 128 instructions, the microprocessor needs to reload a new instruction map, or a new set of instructions, to the file register 202 relatively more often. If the microprocessor is busy serving other system needs, the sequencer is required to wait to be reloaded with a new set of instructions.

One of the objects of the present invention is to avoid excessive use of a valuable system resource such as the microprocessor and to avoid having the sequencer being in a wait condition until the microprocessor is available, provides for reloading a block of 32 sequencer instructions into the register file under the control of instructions contained in the register file itself, rather than requiring the microprocessor to load the register file. In other words, a reloading capability for the sequencer memory is built into the sequencer map itself. This frees the microprocessor for other system tasks and avoids having the sequencer being in a wait condition. Note that the microprocessor loads the buffer memory with all of the instructions blocks which eventually are loaded into the register file 202.

Each instruction block of 32 instructions for the register file 202 also contains decision making instructions regarding which block will be required next and where to find the next set of instructions in the buffer memory.

Figure 4:
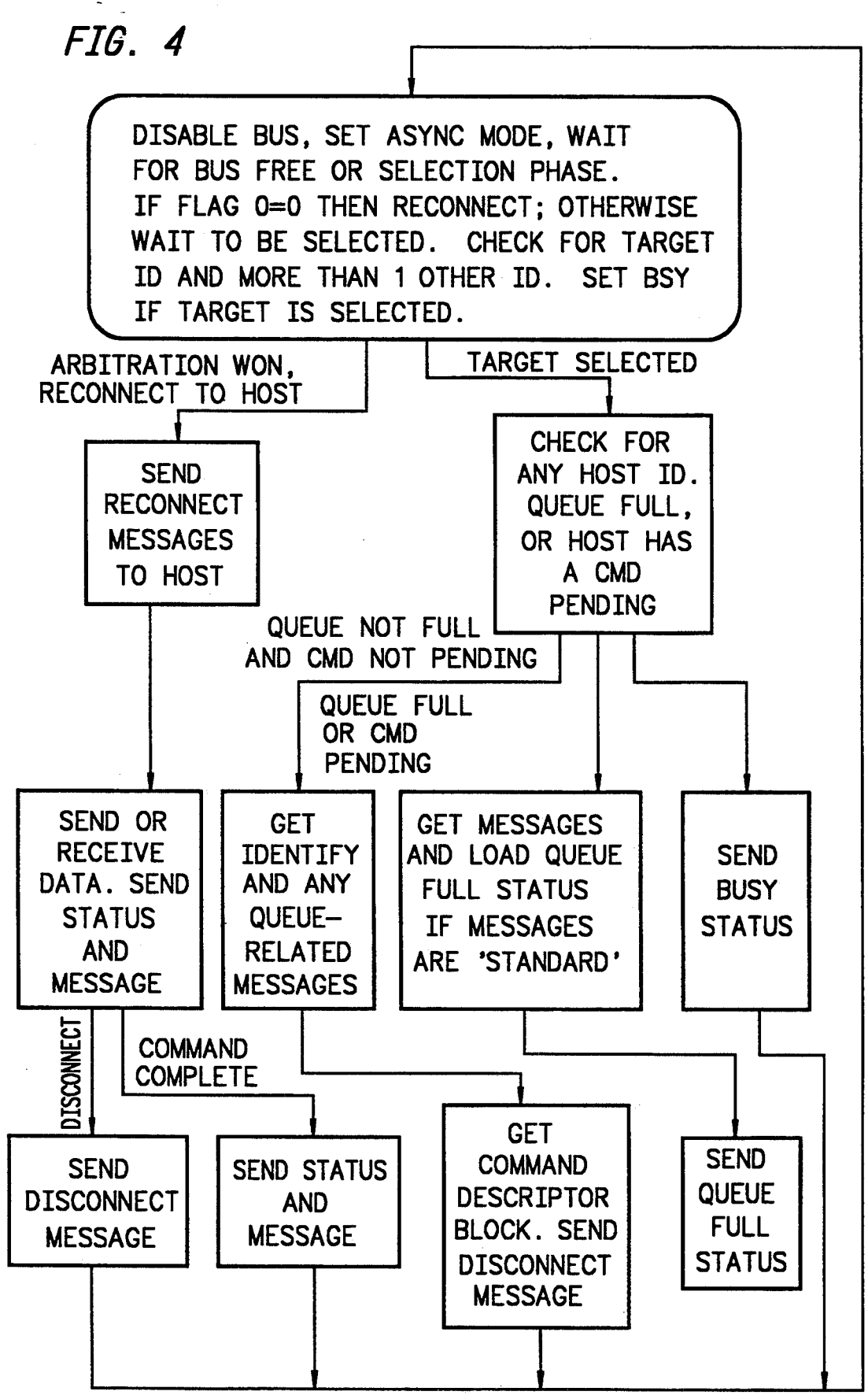
FIG. 4 is a flow chart showing the functional interrelationships between the various microinstruction modules, which are selected to be reloaded into the register file of the sequencer circuit of FIG. 3.

FIG. 4 is an example of a flow chart showing the functional interrelationships between various 32-word microinstruction blocks, or modules, each of which may be selectably stored in the register file 202 of FIG. 3.

FIGS. 5A through 5D show the data structures for various instructions stored in the register file 202 and provided to the output terminals of the register file 202.

Figure 5A:
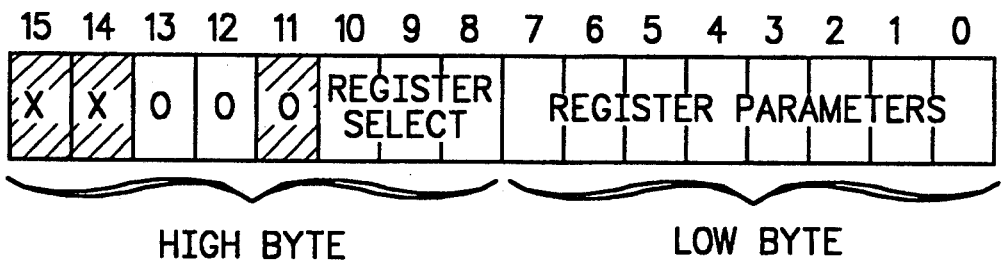
FIG. 5A shows the data structure of a LOAD-REGISTER microinstruction stored in the microinstruction register file of the SCSI sequencer.

FIG. 5A shows the data structure of a LOAD REGISTER microinstruction stored in the instruction register file of the SCSI sequencer. The Load Register op code 00 (bits 12 and 13) causes the register specified in the Register Select field to be loaded with the parameters contained in the Register Parameters field.

TABLE I lists the various Register Select values found at bits 8-10 of the LOAD REGISTER microinstruction and the corresponding registers to be loaded. The first seven of these commands cause the value found at bits 0-7 to be loaded in the designated register.

TABLE I

REGISTER SELECT: THESE BITS ARE DECODED TO SELECT THE REGISTER TO RECEIVE THE REGISTER PARAMETERS:

| Register Select Value | Register |
| --- | --- |
| 111 | Loop Counter (Loop Counter 1 if LC bit = 1, Loop Counter 0 if LC = 0 |
| 110 | SCSI register |
| 101 | General Purpose Register (GPR) |
| 100 | Command Register |
| 011 | Status Code Register |
| 010 | Buffer Pointer High (also resets the FIFO Pointer) |
| 001 | Buffer Pointer Low |
| 000 | Macro Commands |

NOTE:
Writing or reading of these registers while the sequencer is operating may corrupt the sequencer operation or provide invalid data.
Parameters: This byte is the data to be put into the selected register.

Table II lists the MACRO commands, which are called up in a Ld, or Load Register, command as Load Register 000. Macro commands provide a specific function which is used one or more times in the SCSI sequencer code. Macro commands are used to reduce the number of sequencer instructions needed to implement a particular function and may be tailored to meet the needs of a specific application.

TABLE II

| Macro Value | Mnemonic | Function |
|---|---|---|
| 00: | Set_Flg1 | Set Flag1 to 1. Interrupts microprocessor. |
| 01: | Set_Flg2 | Set Flag2 to 1. Interrupts microprocessor. |
| 02: | Rst_Flg1 | Clear Flag1. |
| 03: | Clr_SCSI_PE | Clear SCSI parity error |
| 04: | Set_Flg0 | Set Flag0 to 1. Unreadable by microprocessor. |
| 05: | Rst_Flg0 | Reset Flag0 to 0. Unreadable by microprocessor. |
| 06: | Ld_SCSI_to_DI | Load SCSI bus data into the Data Input register. |
| 07: | Set_Flg 3 | Set Flag3 to 1. Interrupts microprocessor. |
| 08: | Reload_Seq | Reload entire sequencer map. This Macro command loads the sequencer map from buffer memory using the Buffer Pointer value and starts automatically at instruction 0. |
| 09: | Ld_DI_to_FIFO | Load D_Input register to FIFO |
| 0A: | Sav_B_Ptr | Save Buffer Pointers and reset FIFO pointers. A copy of the current 16-bit Buffer pointer value is saved into an unreadable register for future use. The FIFO pointers are reset to 0. |
| 0B: | Restor_B_Ptr | Restore Buffer Pointer and reset FIFO ptr. The 16-bit Buffer pointer value is returned to value last saved by the Sav_B_Ptr Macro. The FIFO pointers are reset to 0. |
| 0C: | Set_Cmd_Q | Set CMD_Q register. Only the unmasked bit (or bits) of D_Input - GPR will set corresponding bit(s) high in the CMD_Q register. |
| 0D: | NOP | No operation. |
| 0E: | FIFO_to_GPR | Prefetch FIFO data to GPR. This is necessary prior to any data transfer from the FIFO to the SCSI bus. |
| 0F: | Ld_GPR_to_FIFO | Load GPR data to FIFO. |

Figure 5B:
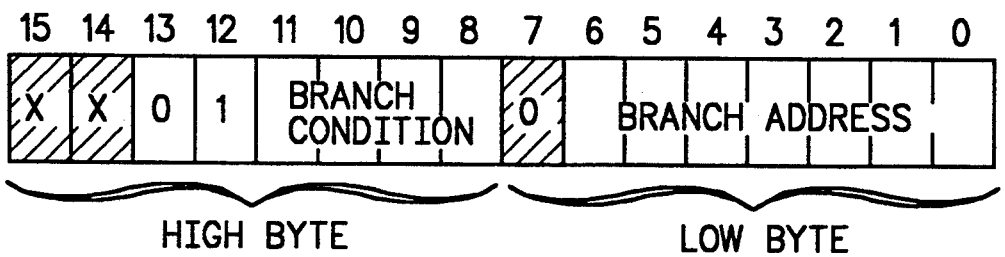
FIG. 5B shows the data structure of a BRANCH Microinstruction stored in the microinstruction register file of the SCSI sequencer.

FIG. 5B shows the data structure of a BRANCH Microinstruction stored in the microinstruction register file of the SCSI sequencer. The Branch command checks an existing condition. If the Branch Condition to be checked is true, the program continues to operate with the instruction found at the address specified by the Branch Address.

The Branch instruction is one of the microinstruction sequences. If the microcode that's running in the sequencer needs to make a decision about what to do next based on the state of one of the interface signals, a branch instruction is inserted into the sequence, and that branch select determines which of the inputs into the branch select logic 301 is gated on to cause the instruction either to branch at the instruction specified in the branch address off the branch instruction, or to continue to the next instruction.

If, for example, the branch instruction says to take a branch when the ATN signal is asserted, the branch logic 303 causes the next sequencer instruction to be taken from the instruction address defined by bits 6 through 0 of the Branch instruction. If ATN (in this case example) were not asserted, then the branch logic 303 would cause the next instruction to be executed to be the next sequential instruction beyond the branch instruction.

The Branch Select Logic 301 (FIG. 3) is a multiplexer used to select one input signal as an input to determine whether the Branch Logic sees a true or false condition. So the Branch Instruction decode selects which one of these bits are gated through this logic into the remainder of the Branch Logic to determine whether the branch is taken or not.

TABLE IIIA lists for the Target Mode the various Branch Condition values specified by bits 8-11 of the Branch Instruction with their corresponding Mnemonic and Description. If the instruction executed is to occur, the branch is at the Branch Address found at bits 0-6.

TABLE IIIA

Branch Condition: The condition to be checked is Decoded from these 4 Bits.

Target Mode:

| Condition Value | Mnemonic | Description |
|---|---|---|
| 0000 | UnderGCorPE | Undefined command group code or parity error detected. |
| 0001 | Atn* | Attention deasserted. |
| 0010 | Bsy | Busy signal asserted. |
| 0011 | Sel | Select signal asserted. |
| 0100 | Par_Err | Parity Error (set by SCSL or buffer parity error). |
| 0101 | I/O | SCSI I/O signal asserted. |
| 0110 | Flag3* | Flag3=0 |
| 0111 | Compare | GPR = D_Input register. |
| 1000 | Flag0* | Flag0=0 |

TABLE IIIA-continued

Branch Condition: The condition to be checked is Decoded from these 4 Bits.

Target Mode:

| Condition Value | Mnemonic | Description |
|---|---|---|
| 1001 | Flag1* | Flag1=0 |
| 1010 | Test_for_0 | Test for 0:(GPR*D)_Input=0) |
| 1011 | No_Cmd_Pend | Command is not pending (GPR*·D_Input ·CMD_Q = 0) |
| 1100 | Uncond | Unconditional (always branch to branch address) |
| 1101 | Arb_Lost | Arbitration Lost: GPR <SCSI bus. |
| 1110 | MT1_or_DB_P | Test for more than 1 bit (GPR*·D_Input= two or more bits are one) or Data Bus Parity Error. |
| 1111 | LC_NZ_Decr | Branch on loop counter not zero and then decrement. (Loop Counter 1 if LC bit=1 Loop Counter 0 if LC=0). |

TABLE IIIB lists for the Initiator Mode the various Branch Condition values found at bits 8–11 with their corresponding Mnemonic and Description.

TABLE IIIB

INITIATOR MODE

| Condition Value | Mnemonic | Description true if: |
|---|---|---|
| 0000 | Msg_Out | Message Out phase |
| 0001 | Stat_Ph | Status phase |
| 0010 | BSY | Busy signal asserted |
| 0011 | SEL | Select signal asserted |
| 0100 | Par_Err | Parity Error (SCSI bus or buffer parity error) |
| 0101 | I/O | SCSI I/O signal asserted |
| 0110 | Cmd_Ph | Command phase |
| 0111 | Compare | GPR=D_Input |
| 1000 | Flag0* | Flag0=0 |
| 1001 | Flag1* | Flag1=0 |
| 1010 | Msg_In | Message In phase |
| 1011 | Data_In | Data In phase |
| 1100 | Uncond | Unconditional (always branch to branch address) |
| 1101 | Arb_Lost | GPR<D_IN. |
| 1110 | Data_Out | Data Out phase |
| 1111 | LC_NZ_Decr | Branch on loop counter not zero and then decrement (Loop Counter 1 if LC bit=1, Loop Counter 0 if LC=0) |

Figure 7:
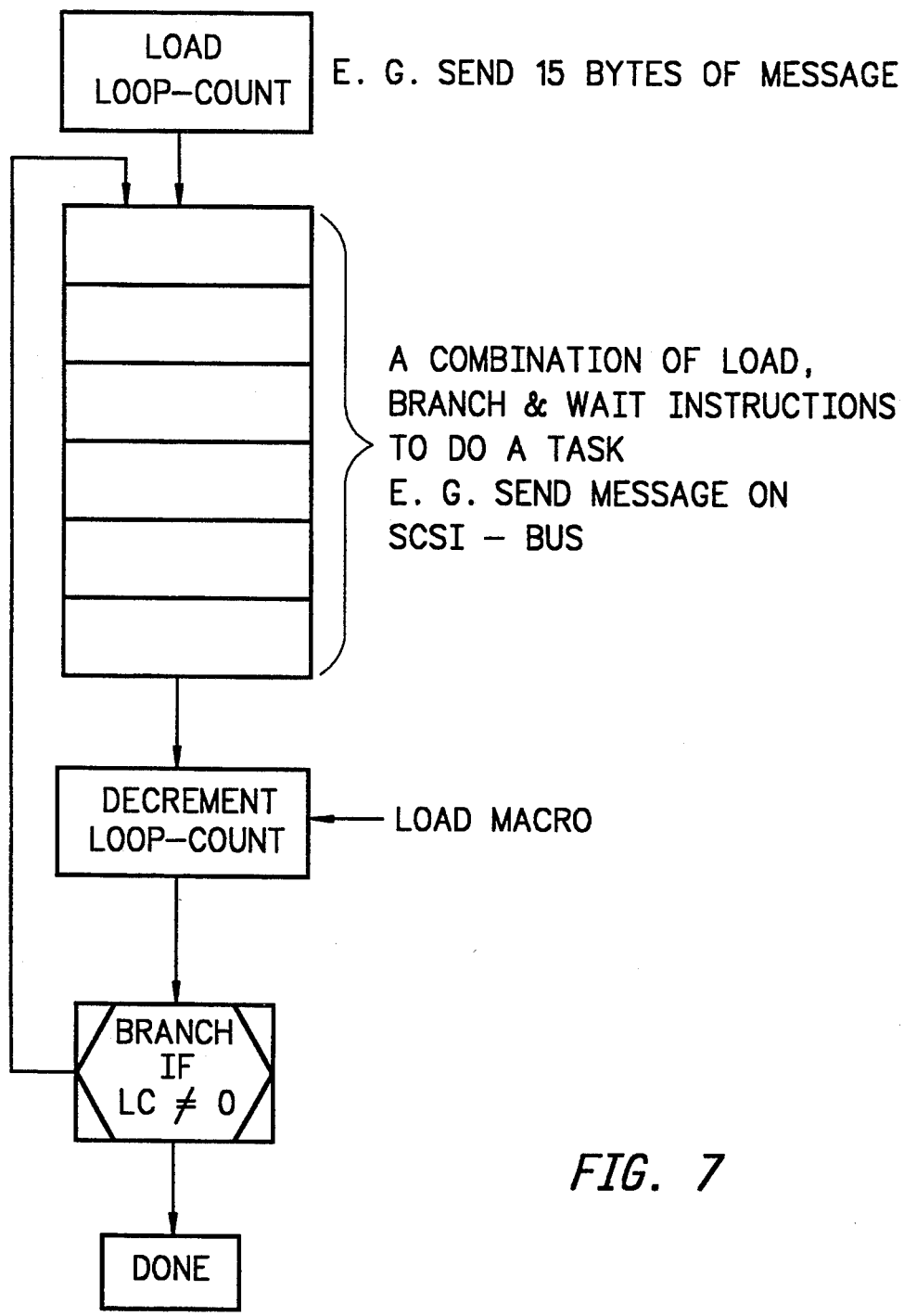
FIG. 7 illustrates a flowchart for a particular sequence of instruction incorporating the Branch instruction and utilizing the loop counter.

In certain instances, the Branch instruction may be used in conjunction with the loop counter 222 shown at the bottom of FIG. 3. A typical operation is shown in flowchart of FIG. 7 where the illustration is of a common example where we want to send 15 bytes of a message, so we need to repeat the same operation many times. The operation begins by loading a loop count, followed by a combination of Load Branch and WAIT instructions to do the task. In this case, send the message on the SCSI Bus. At the end of each message, the loop counter is decremented using an appropriate macro, and there is a branch to return to the second step of this flowchart if the loop counter is not yet at zero. When the loop count reaches zero, as expressed in the loop counter, then the loop counter indicates this occurrence by an appropriate input to the Branch Select Logic 301, detected by Branch Logic 303, which in turn advances the read pointer as described.

Figure 5C:
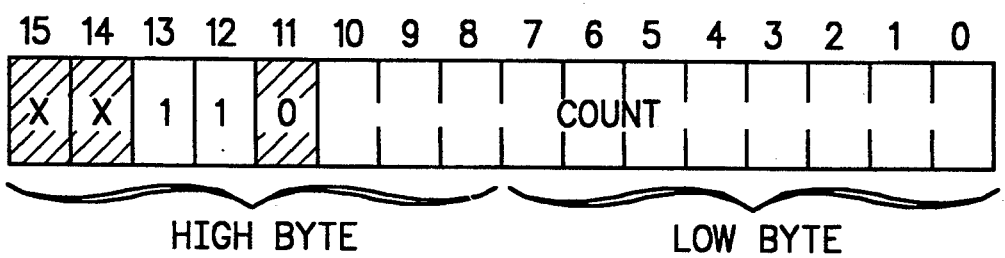
FIG. 5C shows the data structure of a WAIT-SPECIFIC microinstruction stored in the microinstruction register file of the SCSI sequencer.

FIG. 5C shows the data structure of a WAIT GENERAL microinstruction stored in the microinstruction register file of the SCSI sequencer. This command unconditionally waits for the number of bytes (to transfer to or from the host) specified in the Count value.

The Count value provides a transfer length as follows:

| Count Value | Transfer Length |
|---|---|
| 7FFh | 1 byte |
| 000h | 2 bytes |
| 001h | 3 bytes |
| . | . |
| 0FEh | 256 bytes |
| 0FFh | 257 bytes |
| 100h | 258 bytes |
| . | . |
| 1FEh | 512 bytes |
| 1FFh | 513 bytes |
| . | . |
| 7FEh | 2048 bytes. |

Figure 5D:
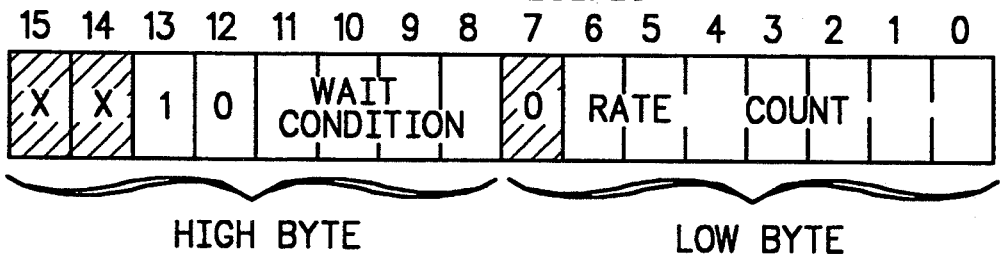
FIG. 5D shows the data structure of a WAIT-GENERAL/microinstruction stored in the microinstruction register file of the SCSI sequencer.

FIG. 5D shows the data structure of a WAIT SPECIFIC microinstruction stored in the microinstruction register file of the SCSI sequencer. This command waits for a specified condition to occur or for a specified time-out condition to occur. If the time-out condition occurs prior to the specified condition, the sequencer is halted, and the local microprocessor is notified via interrupt line IRQ 54. Interrupt code is set at timeout fault.

Table IV lists the Wait Condition value and the corresponding Mnemonic and Description of the event being waited for. These appear at bits 8–11 of the instruction.

TABLE IV

WAIT CONDITION: This Value is Decoded to Select One of the Following Conditions

| Condition Value | Mnemonic | Timeout Possible? | Description Wait For: |
|---|---|---|---|
| 0000 | ACK (Target) | Y | Acknowledge signal asserted (if in Target mode) |
|  | REQ (Initiator) | Y | Request signal asserted (in Initiator mode) |

TABLE IV-continued

| | WAIT CONDITION: This Value is Decoded to Select One of the Following Conditions | | |
|---|---|---|---|
| Condition Value | Mnemonic | Timeout Possible? | Description Wait For: |
| 0001 | ACK* (Target) | Y | Acknowledge signal negated (if in Target mode) |
| | REQ* (Initiator) | Y | Request signal negated (in Initiator mode) |
| 0010 | BSY*_&_SEL | Y | Selection phase |
| 0011 | BSY | Y | Busy signal asserted |
| 0100 | Bus_F_or_Sel_Ph | Y | Bus Free or Selection phase (SEL & BSY*) |
| 0101 | FIFO_Inc | N | Increment the FIFO pointer "Count" times (does not use Rate multiplier). |
| 0110 | Count_Down | N | Count Down using Rate multiplier and Count value. |
| 0111 | Cmd_Input | N | All Command Descriptor Block (CDB) bytes received (Goes active after ACK for last byte) |
| 1000 | Msg_In | Y | Message In phase |
| 1001 | Cmd_Ph | Y | Command phase |
| 1010 | FIFO_E* | Y | FIFO is not empty. This condition is true when Dir=1 and the FIFO has prefetched at least 4 bytes od data from the buffer. |
| 1011 | Undefined | | |
| 1100 | Flag2* | Y | Flag2 not set |
| 1101 | Flag1* | Y | Flag1 not set |
| 1110 | FIFO_Free | Y | A FIFO transfer is not active pending. This condition will be false any time the SCSI FIFO is accessing the buffer RAM. |
| 1111 | Sync_cmplt | Y | Synchronous transfer complete (#REQ = #ACK) |

For Wait Specific conditions which use a timeout condition, the Rate field and the Count field are defined such that the RATE bits are decoded to provide a multiplier for the COUNT. The actual count is (RATE times COUNT)+1. The rate bits (found at bits 5,6) are decoded as follows:

| RATE | COUNT MULTIPLIER |
|---|---|
| 00 | 1 cycle/count |
| 01 | 32 cycles/count |
| 10 | 2048 cycles/count |
| 11 | 65536 cycles/count |

The COUNT value found at bits 0-4 multiplied by the Count Multiplier provides the maximum wait time for a particular Wait Condition of Table IV. If the selected condition does not become true before the count, the sequencer freezes operation by generating an internal Halt signal, which in turn raises the microprocessor interrupt signal. When the count is set to 1F, no timeout will occur. As an example, for a RATE value of 00 (1 cycle per count), a Count value of 00h provides a count of 22 cycles and a Count value of 1Eh provides a count of 31 cycles. As another example, for a RATE value of 01 (32 cycles per count), a Count value of 00h provides a count of 1 cycle and a Count value of 1Eh provides a count of 961 cycles.

The wait select logic 305 is the same as the branch select logic 301. It is a multiplexer with input signals that again cause the wait instruction either to loop on itself to continue executing its own address or to execute the next sequential address. There is no branch address in Wait; but if, for example, the system is waiting for the ATN signal to be asserted, and the ATN signal is not asserted, then the wait select 305 will gate a signal into the wait logic 307, and that signal saying that the ATN signal was not asserted would cause the wait instruction to be executed again and again and again. When ATN is finally asserted, the wait logic 307 would then cause the next sequential instruction after the wait to be executed.

The exclusive OR 307 input of the wait logic is a way to invert, to either take the active or the true or the false condition of the signal as input. So the system can either wait for a condition to occur or wait for the compliment of the condition to occur. And that condition is gated into the wait logic.

Figure 6:
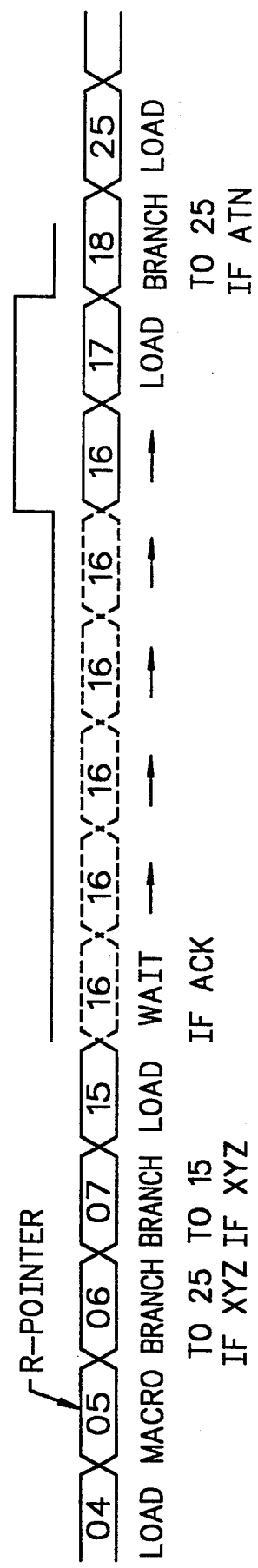
FIG. 6 illustrates an exemplary sequence of instructions which may be carried out using this invention.

FIG. 6 illustrates a typical sequence of instructions which makes use of several of the type of instructions discussed above. For example, the first instruction as designated by the read pointer, instruction 04, is a load instruction of the type shown in FIG. 5A. This instruction will contain register select values to designate a particular register to be loaded, and the values to be loaded in that register. Upon completion of that function, the instruction is complete, and the read pointer moves to instruction 05, which is a macro instruction. This means that the bits 8 through 10 are 000, and that the appropriate macro is now designated by bits 0-3, with bits 4-7 unused. When the macro is complete, the sequencer automatically goes to instruction 06, which is a branch to instruction 25 if XYZ is true. For purposes of this example, assume that XYZ is not true, and therefore the sequencer goes directly to instruction 07, which is a branch to 15 if XYZ (which may be any condition) is true.

For purposes of this example, we assume the condition to be true, so the sequencer goes directly to instruction 15 which is a load instruction of the same type as found at 04. Typically, whatever was previously loaded, the sequencer is now instructed to load at different value. When the load operation is complete, the sequencer and its read pointer moves to instruction 16, which is a WAIT IF ACK, ACK being one of the input signals to the WAIT SELECT logic 305 shown in FIG. 3. According to the WAIT instruction, the sequencer will now wait for the time period designated in the instruction to see if ACK is true. If not, the sequencer remains in 16, and at the end of a time period looks again as shown by the line above. As shown by that line, on the sixth instance, ACK goes true, and the sequencer moves to instruction 17, which is another load instruction. Suppose that the complete time specified in the WAIT instruction had expired and ACK had not been true. Then the sequencer waits for intervention by the external microprocessor because, be definition, the sequencer has limited intelligence so that it can operate at very high speed.

By going to instruction 17, we find a new load instruction, after which at instruction 18 there is another branch to 25 if ATN is true. In this case, we assume ATN, which is an input to the branch select logic is true, causing the sequencer to move to instruction 25 which is another load instruction. In this way, any sequence defined or available through the sequences shown in FIG. 4 can be implemented. Details of several of the specific sequences are shown in the tables which follow, and in Appendix A which is attached hereto and incorporated herein for purposes of providing further exemplary details.

CODE MODULES I through IV are typical modules, or blocks, of 32 instructions with comments. They are lists of the detailed instructions utilized to implement the functional blocks shown in FIG. 4. The instructions are written in a user code prior to being assembled into 14-bit binary instructions. The 14-bit instructions are stored in the buffer memory before being called into the file register 202. The data structure of the various instructions are described in more detail in the descriptions connected with FIGS. 5A through 5D, where Ld is the Load Register command, Br is the Branch command; Wts is the Wait Specific command; Wtg is the Wait General command.

```
CODE MODULE I -- Reselect or be Selected

CODE MODULE I

Msg_Buf:                            ;Just created here to resolve references.
Data_Pointer:                       ;Just created here to resolve references.
Begin:
    Ld   CMD,Enable*+Dir_to_mem     ;Disable all SCSI bus and control lines
    Ld   SCSI, Bsy                  ;Whether we're selected or arbitrating, Bsy will   get
set first
    Ld   GPR,Our_ID                 ;Prepare to load our ID if Arbitration won
    Ld   Buf_Ptr_H,Get_Msgs         ;Pre-load the BPH so that it doesn't have to be done
twice
Cir_Parity:
    Ld   Macro, Cir_SCSI_PE         ;Clear SCSI Bus parity error.
Chk_Select:
    Wts  Bus_F_or_Sel_Ph,No_TO      ;Wait for Bsy to be false for >400ns
    Br   Bsy,Chk_Select             ;before being selected or arbitrating.
    Br   Bsy,Chk_Select             ;/
    Br   Sel,Get_Selected           ;If Sel set, go see if we're selected
    Br   Flag0*,Chk_Select          ;If Flag0 is set, continue on to try to arbitrate  and
win
    Wt   Uncond,400ns               ;Wait additional 400ns (must wait 1200ns between  Bus
Free and arbitration)
    Ld   CMD,Enable+LCO+Dir_fr_mem  ;Enable Bsy on the bus
    Ld   Loop_Count,4               ;Set up a loop to wait 2.4 us before seeing if
                                     arbitration won
Arb_Delay:
    Br   Sel,Begin                  ;If Sel is set, bail out
    Br   LC_NZ-Decr,Arb_Delay       ;Loop back to check Select, decrement
                                     LCO every time
    Br   Arb_Lost,Begin             ;If there is a higher ID, bail out
    Ld   SCSI,Bsy+Sel+IO            ;Otherwise, set Sel and I/O - we've won arbitration
    Ld   Buf_Ptr_L,Send_Hst_Msgs    ;Prepare to send host messages (Identify
                                     and any Q tag msgs)
    Ld   Macro,Reload_Seq
Get_Selected:
    Ld   Macro,Ld_SCSI_to_DI        ;Get the SCSI bus data to compare to our ID
    Br   MT1_or_BD_P,Cir_Parity     ;Make sure there is not more than 1 other ID
    Br   Test_for_0,Chk_Select      ;See if our ID is on the bus
    Br   Bsy,Chk_Select             ;Debounce BSY, if BSY glitched false
                                     during a previous Bsy check
    Ld   CMD,Enable_Dir++to_mem     ;Enable the bus to put Bsy out (disable DB)
    Ld   GPR,Our_ID*                ;Prepare to test for Initiator ID
    Ld   Macro,hlt_Test_For_0       ;Halt if not Initiator ID (SASI)
    Ld   GPR, Qing_Hosts&Our_ID     ;Check to see if a command is pending for this host
    Br   No_Cmd_Pend,Chk_Msgs       ;If no command pending, continue on...
    Ld   Macro,Set_Flag3            ;There is a command pending - set Flag3 as indicator
Chk_Msgs:
    Ld   Macro,Set_Cmd_Q            ;Set the Command Queue register indicating a command
                                     is pending
    Ld   Buf_Ptr_L,Get_Msgs         ;Load the code to get the messages and possibly CDB
    Ld   Macro, Reload_Seq
```

CODE MODULE II -- Get any messages

CODE MODULE II

```
Get_Msgs:
    Ld  Macro,Restor_B_Ptr              ; Restore the pointer to the Command Queue
    Ld  CMD,Enable+ST_F+Dir_To_Mem      ; Make the FIFO ready to be transferred into
    Ld  Macro, Nop                      ; Wait for FIFO to get ready
    Ld  Macro,Ld_DI_to_FIFO             ; Put the Host (and our) ID into the first byte
                                        ;   of FIFO
    Br  Atn*,No_Disconnect              ; If Atn not set, see Flag3 and load the code
                                        ;   to input CDB
    Ld  SCSI,Msg_Out+Bsy                ; Atn set, so change to Msg_out phase
    Wtg 1                               ; Get the first message
    Ld  Macro,hlt_PERR0
    Ld  GPR,Identify_Msg                ; Is it an Identify message?
    Ld  Macro,hlt_Test_for_0            ; No, (it could be an Abort, Bus Device Reset...)
    Ld  GPR,DiscPriv_bit                ; It is an Identify message, is Disconnect supported?
    Br  Test_for_0,No_Disconnect        ; No Disconnect, so set Flag3
    Br  Uncond,Msg_2                    ; Disconnect is supported so don't set Flag3

No_Disconnect:
    Ld  Macro,Set_Flag3                 ; Set Flag3 to indicate to halt after CDB input Msg_2:
    Br  Atn*,Flush_FIFO                 ; If Atn isn't set, go check for parity error on
                                        ;   Identity
    Wtg 1                               ; Get the next message byte
    Ld  GPR, Head_of_Q_msg              ; Is this message a Head of Queue tag message?
    Br  Compare,Msg_3                   ; If yes, then go get the tag value byte
    Ld  GPR,Simple_Q_msg                ; Is this message a Simple Queue tag message?
    Br  Compare,Msg_3                   ; If yes, then go get the tag value byte
    Ld  GPR,Ordered_Q_msg               ; Is this message an Ordered Queue tag message?
    Ld  Macro,hlt_Compare*              ; If it isn't any of these, then halt Msg_3:
    Ld  Macro,hlt_ATN*1                 ; Halt if Atn is not set, the host is broken
                                        ;   (not tag value)
    Wtg 1                               ; Get the tag value
    Ld  Macro,hlt_Atn0                  ; Halt if Atn is still set (no known message expected)

Flush_FIFO:
    Ld  CMFD,Enable+ST_F*+Dir_To_Mem    ; Flush the Initiator ID and any message(s) to buffer
    Wts Uncond,8                        ; Wait 8 cycles for FIFO_Free to be set to proper value
    Wts FIFO-Free,20us                  ; (actually 19.2us)
    Ld  Macro,hlt_PERR0                 ; Halt if there was a parity error on any message byte
    Ld  Buf_Ptr_L,Get_CDB               ; Go load the code to input the CDB
    Ld  Buf_Ptr_H,Get_CDB               ; /
    Ld  Macro,Reload_Seq                ; /
```

CODE MODULE III -- Decode and input CDB

CODE MODULE III

```
Get_CDB:
    Ld  Macro,Restor_B_Ptr              ; Restore the buffer pointer to Command area
    Ld  CMD,Enable+ST_F+Dir_Fr_Mem      ; Bring in the Initiator ID and any message(s)
    Wts FIFO_Free,20us                  ; Wait for FIFO to fill
    Ld  CMD,Enable+St_F*+Dir_Fr_Mem     ; Turn off the transfer in this direction
    Wts FIFO_Free,20us                  ; Wait for pad-out
    Ld  Macro,Retor_B_Ptr               ; Restore the buffer pointer back to this command
                                        ;   Location
    Ld  CMD,Enable+ST_F+Dir_To_Mem      ; Enable the FIFO to be written in to (with the  CB)
    Wts FIFO_Inc,4                      ; Bump FIFO write pointer to CDB point
    Ld  SCSI,Cmd_Phase+Bsy              ; Set SCSI bus to command phase
    Wtg 1                               ; Get the first byte of the CDB
    WTS CMD_Input,No_TO                 ; Get the remaining bytes of the CDB
                                        ; NOTE: If the hardware can't decode the Group Cb,
                                        ;   it will bring in another 5 byte anyway.
    Ld  Macro,hlt_Undef_GC_or_PE        ; Halt if the first byte was an unknown GC or there
                                        ;   was a parity error on any byte in the CDB
    Ld  GPR,0                           ; Check control byte for non-zero,
    Ld  Macro,Hlt_Compare*              ; It might be a Linked command.
    Ld  CMD,Enable+ST_F*Dir_to_Mem      ; Flush the Host ID, any message(s), and CDB to buffer
    Wts FIFO_Free,20us                  ; Wait for flush to complete
    Ld  Macro,hlt_Atn1                  ; Halt if the Initiator has Atn set
    Br  Flag3*,Disconnect               ; If Flag3 is not set then it is ok to Disconnect
    Ld  Status_Code,No_Disconnect       ; Halt and interrupt up (C4 code)
Disconnect:
    Ld  CMD, Enable+Dir_Fr_Mem          ; Set up to transfer out
    Ld  SCSI, Bsy*Msg_In                ; Set the bus to Message in phase
```

```
    Ld  GPR, Disconnect_Msg           ;  Load Disconnect message into GPR
    Wtg 1                             ;  Do Req/Ack sequence to transfer message
    Ld  Macro,hlt_Atn2                ;  Halt if Initiator set Atn
    Ld  CMD,Enable*+LC1               ;  Get off the bus and change to Loop Counter 1
    Br  LC_NZ_Decr,Load_Begin         ;  If LC1 is zero, then there is no more space for cmds
    Ld  Macro,Set_Flag3               ;  So indicate Queue is full by setting Flag3
Load_Begin:
    Ld  Macro,Sav_B_Ptr               ;  Save the current buffer pointer (points to next
                                      ;  cmd entry)
    Ld  Macro,Set_Flag2               ;  Set Flag2 indicating command has been brought in
    Ld  Buf_Ptr_L,Begin               ;  Load the Begin sequence and start from the top
    Ld  Buf_Ptr_H,Begin               ;  /
    Ld  Macro,Reload_Seq              ;  /
```

CODE MODULE IV -- Reconnect and transfer messages

CODE MODULE IV

```
Send_Hst_Msgs:
Select_Host:
    Ld  Buf_Ptr_L,Msg_Buf             ;  Set Buffer Pointer to message location.
    Ld  Buf_Ptr_H,Msg_Buf             ;  /
    Ld  LC0,1                         ;  Set LC0 with number of messages to send.
    Ld  GPR,Our_ID&Init_ID            ;  Load Target and Initiator Id's for reselection
    Ld  SCSI,Bsy+Sel+IO               ;  Assert Select Line
    Ld  SCSI,Sel+IO                   ;  Negate Bsy line to go into reselection phase
    Wts Bsy,250ms                     ;  Wait up to 250ms (Selection timeout) for Init to
respond
    Ld  SCSI,Msg_In_Bsy               ;  Keep Bsy asserted to help bus integrity
    Ld  Macro,Nop                     ;  Load the Status Code register with code indicating
                                      ;  reconnection
    Ld  CMD,Enable+St_F+Dir_Fr_Mem    ;  Enable the transfer from buffer to FIFO
    Wts FIFO_Free,20us                ;  Wait for FIFO to fill
    Ld  Macro,hlt_PERR1               ;  Halt if there is a parity error
    Ld  Macro,FIFO_to_GPR             ;  Prefetch the first message
Send_Rcnct_msgs:
    Wtg 1                             ;  Transfer the byte to the Initiator
    Ld  Macro,hlt-Atn3                ;  Halt if Atn if set (not expected)
    Br  LC_NZ_Decr,Send_Recnct_Msgs   ;  Branch if more messages to send
Continue:
    Ld  CMD,Enable+St_F*+Dir+Fr_Mem   ;  Enable the transfer from buffer to FIFO
    Wts FIFO_Free,20us                ;  Wait for any "pad out" to finish
    Ld  Macro,hlt_PERR1               ;  Make sure any FIFO prefetches don't leave
                                      ;  a dangling buffer parity error
    Ld  Macro,Rst_Flag0               ;  Reset Flag0 not to disconnect after data phase
    Ld  Buf_Ptr_L,Data_SeqAR          ;  Load in the Data transfer code
    Ld  Buf_Ptr_H,Data_SeqAR          ;  /
    Ld  Macro,Reload,Seq              ;  /
```

Note that, for the two lines of instructions before the last line of code in Code Modules II, III, and IV, the beginning and ending addresses of the next module to be loaded into the register file 202 are specified with the Ld Buf_Ptr_L and the Ld Buf_Ptr_H commands. The very last line of code in all of the Code Modules is the Ld Macro,Reload_Seq command, which is a Macro command to reload the entire sequencer map.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Appendix A - SCSI Sequencer Programming Examples

1. Target programming

1.1. Getting selected

Prior to receiving the command, the sequencer must be in the Asynchronous and Target modes. This is done by the microprocessor through the Mode register.

The microprocessor must also 'preset' the Buffer pointer value to the address of the first available command queue location and Loop Counter 1 must be set to the number of consecutive locations (16-byte blocks) available for command queuing. The Buffer Pointer value is loaded and then the Save Buffer Pointer Macro command is executed.

The first instructions executed cause the SCSI bus to be disabled (Bus Free) and the FIFO pointers reset to 0. Since the direction of data is in (to SCC), the direction bit is set to a 1.

The sequencer then waits for either Bus Free or Selection phase.

```
;*****************************************************************************
Begin:
        Ld      CMD,Enable*+DM       ; Disable all SCSI signals. Asynchronous Chk_Select:
        Wt      Bus_Free+Sel_Phase   ; Wait for Bus Free or Selection phase.
                                     ;   Note that Bus Free phase is qualified in
                                     ;   hardware as Busy and Select being false
                                     ;   continuously for >400ns.
        Br      Sel,Get_Selected     ; If Selection phase, see if we are selected
        Br      Uncond,Chk_Select    ; Go back and wait for selection phase
;*****************************************************************************
```

1.2. Determining if the Target is being selected

The General Purpose Register (GPR) is used in all masking and compare functions to test for the bit or bytes to compare against. Since the bus data can change 95ns after Busy is asserted, the Target checks to make sure Busy was not asserted or else the data brought in may be bad. The Test_For_0 condition logically 'and's the bit (or bits) set in the GPR with those in the D_Input register. The SCSI bus data is moved into the D_Input register for use in the comparisons. If the result is zero, the branch will be taken. In this particular case, if the Target ID is not on the bus, the target has not been selected.

```
;*****************************************************************************
Get_Selected:
        Ld    GPR,Our_ID             ; Get ready to check for our ID
        Ld    SCSI_to_D_Input        ; Get SCSI bus data into D_Input register Br    Bsy,Chk_Select
        Br    Test_for_0,Chk_Select
;*****************************************************************************
```

1.3. Checking for multiple host ID's

Given that the Target ID is still in the GPR, the "more-than-1-or-data-bus-parity-err" (MT1_or_DB_P) branch condition will test for more than 1 bit set OTHER THAN THE TARGET'S, or if there was a SCSI data bus parity error. If there are multiple IDs or a selection parity error, the sequencer just returns to wait for the selection phase again.

```
;*****************************************************************************
        Br    MT1_or_DB_P,Chk_Select
;*****************************************************************************
```

1.4. Completing the selection

If the I/O signal is asserted, there is a problem because this designates the *Reselection* phase and this is a Target. The sequencer halts and interrupts the microprocessor if the I/O signal is asserted, otherwise it continues. (The programmer may choose to use the Br IO, Chk_Select command instead, but the IO-true-when-our-ID-is-asserted situation should never occur)

The Target is selected, so Bsy is asserted.

```
;*****************************************************************************
Selected:
        Hlt     IO                  ; If Reselection phase interrupt uP and halt Ld      SCSI,Bsy            ; Set Bsy in register (not on bus yet)
        Ld      CMD,Enable          ; Put Bsy on bus
;*****************************************************************************
```

1.5. Checking for ANY Host ID

It may be important for the system not to hold up any pending commands with a non-disconnecting host. If there is no host ID (as in SASI and some SCSI 1 hosts) then the host cannot disconnect. The microprocessor may choose to automatically generate Busy status or bring in the command and begin executing it.

```
;*****************************************************************************
;* See if there is ANY host ID.
;*****************************************************************************
Chk_Host:
        Ld      GPR,Our_ID*         ; Load the complement of our ID to see if
                                    ; ANY Host ID is present
        Hlt     Test_For_0          ; If no Host ID, halt and interrupt uP.
;*****************************************************************************
```

1.6. Checking for command in progress / queueing hosts

The SCC SCSI sequencer has the ability in hardware to check for an already existing command from this host. To indicate that a particular host supports queueing, a 0 should be entered in the corresponding bit of the "Queueing Hosts" value in the sequencer code. Note that this is an immediate value in the sequencer code so the microprocessor must write the value as it changes (via Mode Select) directly into the sequencer code.

If there is already a command pending or the queue is full, the sequencer will bring in any message(s) and then generate Busy Status if the message(s) are "normal" (Identify or Queue Tag messages) otherwise the sequencer will interrupt the microprocessor.

If there was not a command pending and the queue was not full, the sequencer will continue on to bring in any message(s) and the command.

```
;*****************************************************************************
;* See if the queue is full and it's ok to bring in a command from this host.
;*****************************************************************************
        Br      Flag3*,Continue_Chk; If Flag3 is set, the queue is full so
        Br      Uncond,Dont_Queue   ; input messages but not command.

Continue_Chk:
        Ld      GPR,Qing_Hosts      ; Check to see if ok to bring in command
        Br      Cmd_Pending*,Chk_Msgs ; Are there any commands pending?

;*********
;   Check messages (queue NOT available)
;*********
Dont_Queue:
        Br      Atn*,Gen_Bsy_Status; If the host doesn't want to send a message
                                    ; then issue Busy Status.
```

```
            Ld    Buf_Ptr_L,Dont_Queue_L   ;
            Ld    Buf_Ptr_H,Dont_Queue_H   ;
            Ld  - Reload_Code              ; Get the "Don't Queue" code.

Gen_Bsy_Status:
            Ld    Buf_Ptr_L,Gen_Bsy_Status_L    ;
            Ld    Buf_Ptr_H,Gen_Bsy_Status_H    ;
            Ld    Reload_Code              ; Go generate Busy Status.

;*********
;    Check messages (queue available)
;*********
Chk_Msgs:
            Ld    Set_CMD_Q                ; Set the appropriate Cmd_Queue bit
            Hlt   Atn*                     ; If Atn set, get the message byte(s).
                                           ; No message, no disconnect allowed.
                                           ; This instruction might be replaced with a
                                           ;  Br Atn*,... instruction which would allow
                                           ;  the sequencer to automatically send Busy
                                           ;  status.
            Ld    Buf_Ptr_L,Get_Msgs_L;    Load the code to Get the messages
            Ld    Buf_Ptr_H,Get_Msgs_H;
            Ld    Reload_Code              ;
;*****************************************************************************
```

1.7. Receiving command oriented messages

Currently, the "automatic" queueing method needs to make sure the host at least supports disconnect. Any first message other than an Identify message WITH the disconnect bit set, will result in an interrupt to the processor and a halt of the sequencer.

Subsequent messages to the Identify must be queue tag messages or the sequencer will again interrupt and halt. NOP messages are also considered strange and unnecessary.

The sequencer also will interrupt and halt if the queue tag message was sent but no third byte (tag value) is sent.

```
;*****************************************************************************
Get_Messages:
            Ld    CMD,Enable+ST_F+Dir_In;  Get the FIFO ready to transfer
            Ld    D_Input_to_FIFO         ; Put Host SCSI ID in FIFO
            Ld    SCSI,Msg_Out+Bsy        ; Set message out phase
            Wt    1                       ; Get the first message Ld    GPR,Identify_Msg        ; Prepare to check the first message for
                                          ;  Identify
            Hlt   Test_for_0              ; If bit 7 is 0, this message is not an
                                          ;  Identify message
Chk_Dis:
            Ld    GPR,Disconnect_bit      ; See if disconnect supported
            Hlt   Test_for_0              ; If disconnect supported, get second Msg
Msg_2:
            Br    Atn*,Chk_Prty           ; If Atn is not set, check parity error
            Wt    1                       ; Get the second message
            Ld    GPR,Head_of_Q_msg       ; See if it's a Head of Queue tag message
            Br    Compare,Msg_3           ; If Head of Queue msg, get next msg
            Ld    GPR,Unordered_Q_msg     ; See if Unordered Queue message
            Br    Compare,Msg_3           ; If Unordered Queue msg, get next msg
            Ld    GPR,Ordered_Q_msg       ; See if Ordered Queue message
            Hlt   Compare*                ; If not an Ordered Queue msg, Halt
Msg_3:
            Hlt   Atn*                    ; If Atn is not set, halt (no tag value)
Get_Msg_3:
            Wt    1                       ; Get the third message
            Ld    D_Input_to_FIFO         ; Put last byte into FIFO before flushing
```

```
Chk_Atn_3:
        Hlt  Atn                    ; If Attention set, Halt
Chk_Prty:
        Hlt  Parity_Err              ;
;********************************************************************
```

1.8. Command Packet Descr

Since commands are queued with virtually no involvement from the microprocessor, the Host ID, messages and command must be placed in a known location so that the microprocessor can find them. Below is a diagram of the current use of the 16-byte area for each command packet. The Host ID is in the first byte followed by, at most, 3 message bytes (an Identify message and Queue Tag message), and then the command (up to 12 bytes).

To make sure the microprocessor can differentiate the 'good' messages from the bad ones, the extra 2 bytes of an Identify-only command are filled with 'FF's.

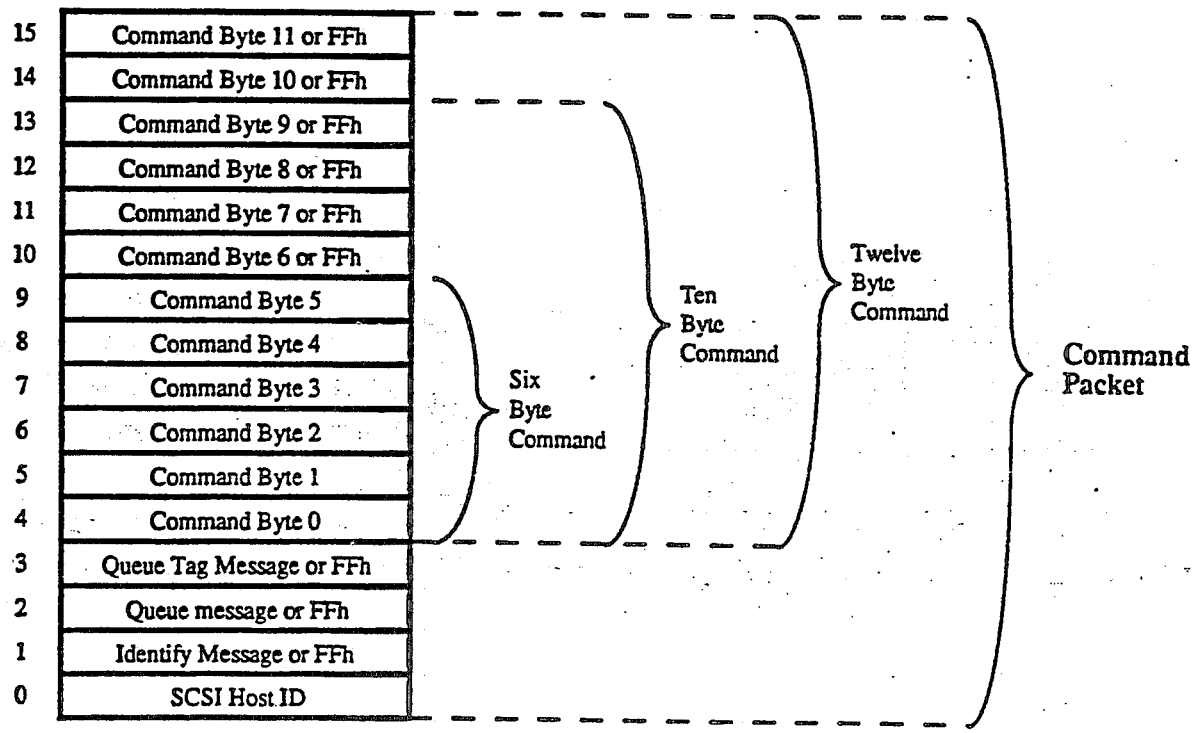

1.9. Receiving the command

Commands may be 6, 10, or 12 bytes long. The command opcode (the first byte of the command) determines the length of the command. Hardware is built into the SCSI sequencer to decode a byte placed into the CMD_Byte register and generate a Wait condition when all the bytes have been input. The CMD_Byte register will also set and flag called "Undefined group code" if it can't figure out the length of the command (see the SCSI II spec for the undefined group codes). SCSI bus parity error is also or'ed into the "Undefined group code" flag to reduce sequencer instructions.

The remainder of the command is done by executing the special Wait Specific command of "Wt All_CDB_Input" which brings command bytes into the FIFO until the internal command length is exhausted.

Since disconnecting is forced by all our checking of the messages, the sequencer always disconnects after the command is input. The sequencer then goes to bus free and loops around to input another command if the command count has not been exhausted.

Turning off the ST_F bit in the CMD register (not to be confused with the CMD_Byte register) causes the entire FIFO contents to be written to buffer RAM.

```
;*******************************************************************************
Get_CDB:
        Ld      CMD,Enable+ST_F+Dir_In; Get the FIFO ready to bring in data.
        Ld      SCSI,Cmd_Phase+Bsy      ; Go to Command Phase
        Wt      1                       ; Get the first command
        Ld      D_Input_to_CMD_Byte;    Put the command byte in decode location
        Hlt     Undef_GC_or_PE          ; Set an error if command byte is of
                                        ;   an undefined group code or there was a
                                        ;   SCSI bus parity error
        Wt      All_CDB_Input           ; Get all the Command Descriptor block
        Ld      D_Input_to_FIFO         ; Put last byte into FIFO before flushing
        Ld      CMD,Enable+ST_F*        ; Don't transfer any more automatically,
                                        ;   flush the FIFO to buffer
        Hlt     Parity_Err              ; If parity error on CDB, halt
Disconnect:
        Hlt     Atn                     ; If Attention is set, Interrupt and halt
Send_Disc_Msg:
        Ld      CMD,Enable+Dir_Out
        Ld      GPR,Disc_Msg            ; Put Disconnect message on bus
        Ld      SCSI,Bsy+Msg_In         ; Set Message In phase
        Wt      1                       ; Send the message
Go_to_Bus_Free:
        Hlt     Atn                     ; If no Atn, set bus free
Set_Bus_Free:
        Ld      CMD,Enable*             ; Disable SCSI data bus signals, flush FIFO
        Wt      FIFO_Free,20us          ; Wait for the FIFO to be put into buffer
Command_Loop:
        Br      Decr_LC_BNZ,Begin       ; If all command buffers aren't full, loop
        Ld      Set_Flag1               ; Set Flag1 indicating command buffers full
        Br      Uncond,Begin            ; Loop back to beginning to be able to get
                                        ;   selected and generate busy status
;*******************************************************************************
```

1.10. Reselecting a Host

Any queued command will need to be completed by reconnecting to the host specified by the first byte of the command block. The sequence timing is critical but the basic method will be expanded here.

First the sequencer makes sure that no signals are on the SCSI bus. This is redundant for the first loop but is necessary to disable Busy and our ID if arbitration is lost.

Next the sequencer is prepared for arbitration with the GPR set to our ID and the Loop Counter set to wait ≥2400ns for the arbitration delay.

The sequencer then waits for either Bus Free phase or Selection Phase. The Bus Free phase is qualified in hardware for 400ns per the spec. If the Selection phase is detected, the sequencer will fall through and halt because some host is trying to select a target (and it may be us).

If Bus free was found with no Select, the sequencer asserts the Busy signal to begin arbitration. The required 2400ns is waited while looking for Select again. If Select is not found during the delay period, the sequencer checks to see if our ID is the highest on the bus. If the sequencer won arbitration, the SCSI Select signal is asserted to signify that it has won arbitration. There is a 1200ns delay to allow all other arbitrators to remove their ID's and Busy signals from the bus before the sequencer can assert our ID along with the Host ID.

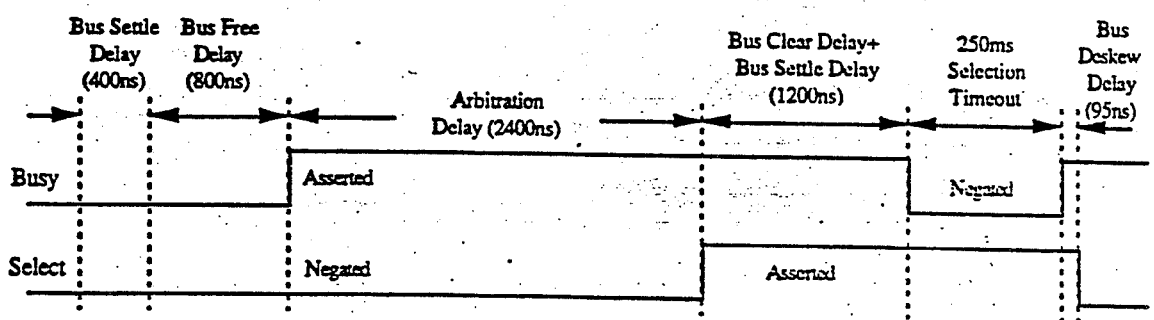

```
;*********************************************************************
                                    ; GPR still has Our ID in it
            Ld    SCSI,Bsy           ; Set Bsy, prepare to arbitrate
            Ld    CMD,Enable+LC1     ; Put out Bsy and our ID. Use Loop Counter 1
            Ld    Loop_Count,5       ; Set up to wait 2.4us arbitration delay
Arb_Delay:
            Br    Sel,Begin          ; If Sel, then we lost Arbitration
            Br    Decr_LC_BNZ,Arb_Delay; Keep looping until 2.4us
            Br    Arb_Lost,Begin     ; If there is a higher ID, we lost
            Ld    SCSI,Sel           ; Assert Select
Select_Host:
            Wt    1000ns             ; Wait 1200 ns after asserting Select
            Ld    GPR,Our_ID+Init_ID ; Assert our ID and initiator's ID
            Ld    SCSI,Msg_In+Bsy+Sel; Set to message in phase
            Ld    SCSI,Msg_In+Sel    ; Release Busy line
            Wt    400ns              ; Wait for bus settle delay
            Wt    Bsy,250ms          ; Wait for 250ms selection time-out
            Ld    SCSI,Msg_In+Bsy+Sel; Assert Busy
            Ld    SCSI,Msg_In+Bsy    ; Release Select line
;*********************************************************************
```

1.11. Transferring the reconnect sequence of messages

The reconnect sequence of messages will normally contain the Identify message followed by any Queue Tag messages. In addition there may also be Restore Buffer pointers message. Since these are all within the Message In phase (as opposed to the Status and Message information) they can easily be put into the buffer by the microprocessor and sent out in 1 burst of messages.

At the end of the message the sequencer again checks to see that the host did not detect an error (i.e. a message parity error).

```
;*********************************************************************
Send_Messages:
            Ld    Bfr_Ptr_L,(Msg_L)  ; Get Buffer pointer location
            Ld    Bfr_Ptr_H,(Msg_H)  ;  "       "       "       "
            Ld    CMD,Enable+ST_F+Dir_In ; Get the FIFO ready to transfer
            Wt    FIFO_Free,20us     ; Wait for the FIFO to fill
            Hlt   Parity_Err         ; Halt if there is a Parity Error
            Ld    FIFO_to_GPR        ; Get the first byte from FIFO to GPR
            Wt    Num_Msgs           ; Send the messages
            Ld    CMD,Enable+Dir_In+ST_F* ; Stop the auto handshake, ST_F*

Wt    FIFO_Free,20us     ; Wait for the FIFO to fill

Hlt   Atn                ; If attention line is active, go tell uP
;*********************************************************************
```

1.12. Transferring data

Sending or receiving data is done as an integral number of logical blocks. The loop count contains the number of logical blocks to transfer. In this example, blocks are contiguous.
The lines with numbers indicate the only differences between Sending or Receiving data.

```
;*********************************************************************
;   Send data to Host                        Receive data from Host Ld    Loop_Count,Num_Blocks; Get ready to transfer the data
            Ld    Bfr_Ptr_L,Data_L   ; Get Buffer pointer location
```

```
              Ld    Bfr_Ptr_H,Data_H  ;   "    "        "         "
              Ld    Reset_FIFO_Pointers; Reset the FIFO pointers
1       Ld    SCSI,Bsy+Data_Out                    Ld  SCSI,Bsy+Data_In First_Data:

2       Ld    CMD,Enable+ST_F+Dir_from_Mem         Ld  CMD,Enable+ST_F+Dir_to_Mem
3       Wt    FIFO_E*,20us                         Ld  Nop
4       Ld    FIFO_to_GPR                          Ld  Nop Wt    Block_Size-1
              Br    Decr_LC_BNZ,Data_Loop; Loop if more blocks to transfer
              Br    Uncond,Data_End    ; No more data so exit
Data_Loop:
              Wt    Block_Size
              Br    Decr_LC_BNZ,Data_Loop; Loop until all blocks are transferred
Data_End:
              Wt    Sync_Empty         ; Wait for sync pipe to empty - waits for
                                       ; synchronous Ack's to catch up to Req's at
                                       ; end of block transfer.  The sync pipe is
                                       ; always empty for asynchronous transfers.
              Ld    CMD,Enable+ST_F*   ; Flush the FIFO
              Hlt   Parity_Err         ; Halt if a SCSI or FIFO parity err
              Hlt   Atn                ; Halt if host wants to send message Wt    FIFO_Free,20us Send_St_and_Msg:
              Ld    SCSI,Status_Phase  ; Put bus into Status phase
              Ld    CMD,Enable+Dir_Out ; Send data to Host
              Ld    GPR,Status         ; Send Busy Status
              Wt    1                  ; Send the message
              Ld    SCSI,Bsy+Msg_In    ; Set Message In phase
              Ld    GPR,Command_Complete; Send Command complete message
              Wt    1
              Br    Atn*,Go_to_Bus_Free; Go back to be selected
              Ld    Stat_Code,Atn_after_msg; Set error code register to halt with a
                                       ; code indicating that the host had Atn set
                                       ; after the last message
;*************************************************************************
```

1.13. Partitioning the sequencer code

The SCSI sequencer only has 32 instruction locations but may be reloaded automatically. To take advantage of the reloading feature, the code may be partitioned appropriately. An example of this partitioning is given below.

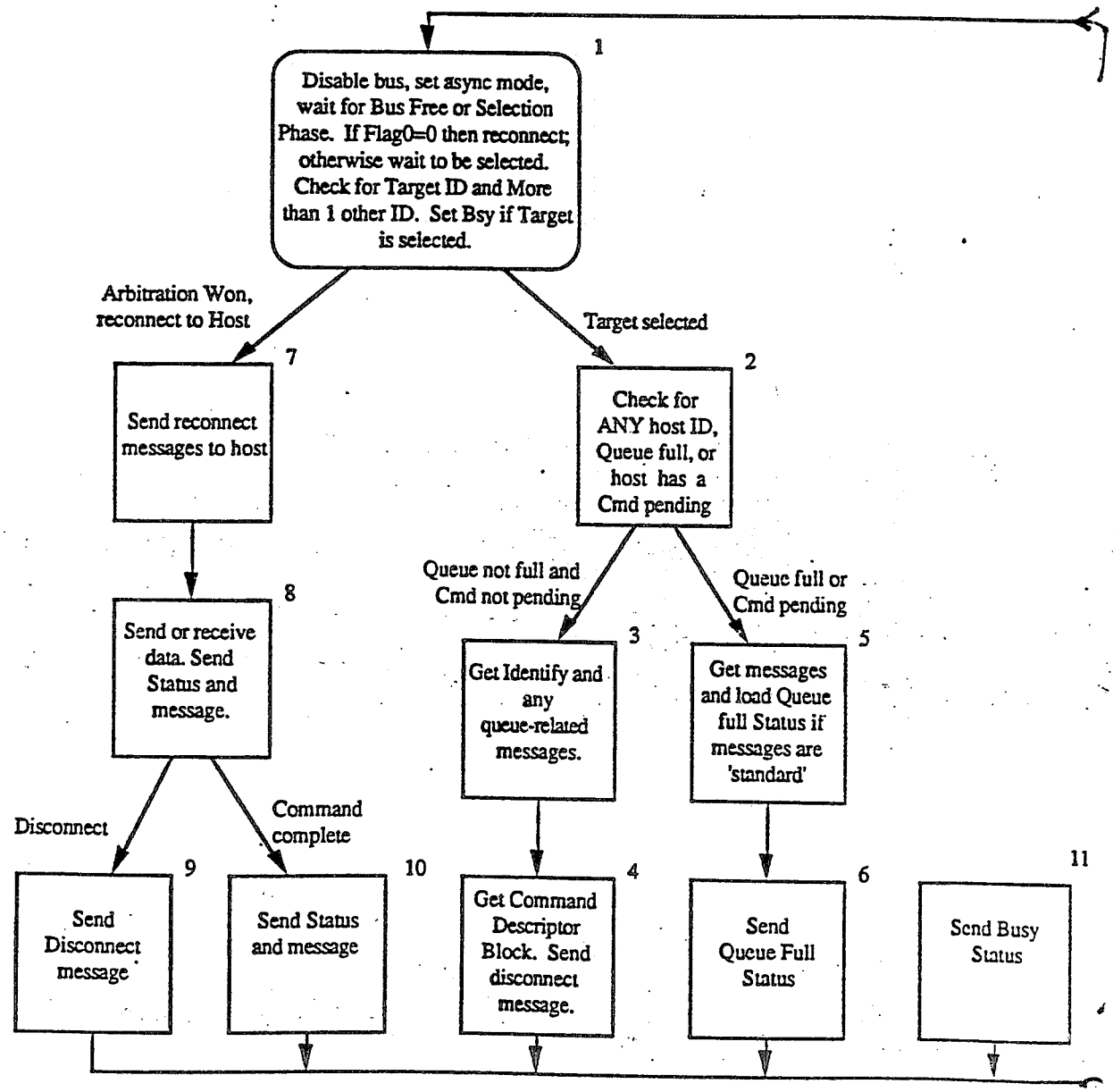

1.13.1. Section #1 - Get selected or Reconnect

```
;
;*****************************************************************************
;* Arbitrate and win (after determining bus free) OR Get selected.
;* Flag0 set to a 1 indicates that no reconnect is necessary.
;* Prior to starting the sequencer, the microprocessor writes the beginning of
;* the command buffer address into the Buffer Pointer and executes the
;* Save_Buf_Ptr macro.  When the sequence gets down to the Identify and
;* message section, the buffer pointer is restored and the command is saved.
;*****************************************************************************
;
```

```
Begin:
        Ld      CMD,Enable*+DM       ; Disable all SCSI signals, asynchronous
        Ld      GPR,Our_ID           ; Get ready to put our ID on SCSI bus
        Ld      Rst_FIFO_Ptr         ; Reset FIFO pointers to 0
Chk_Select:
        Wt      Bus_Free+Sel_Phase   ; Wait for Bus Free or Selection phase.
                                     ;   Note that Bus Free phase is qualified in
                                     ;   hardware as Busy and Select being false
                                     ;   for >400ns.
        Br      Sel,Get_Selected     ; If Selection phase, see if we are selected
        Br      Flag0*,Chk_Select    ; If Flag0 is clear, just get selected Ld      SCSI,Bsy             ; Set Bsy, prepare to arbitrate
        Ld      CMD,Enable+LC1       ; Put out Bsy with our ID. Use LC1
        Ld      Loop_Count,5         ; Set up to wait 2.4us arbitration delay
Arb_Delay:
        Br      Sel,Begin            ; If Sel, then we lost Arbitration
        Br      Dec_LC_JNZ,Arb_Delay ; Keep looping until 2.4us
        Br      Arb_Lost,Begin       ; If there is a higher ID, we lost
        Ld      SCSI,Sel             ; Assert Select
        Ld      Buf_Ptr_H,Send_Data_H;
        Ld      Buf_Ptr_L,Send_Data_L;
        Ld      Reload_Code          ; Load the code to send data ;******************************************************************************
;* Check to see if we are the selected Target
;******************************************************************************

Get_Selected:
        Ld      SCSI_to_D_Input      ; Get SCSI bus data into D_Input register
        Br      Bsy,Begin
        Br      Test_for_0,Begin
        Br      MT1_or_DB_P,Begin
Selected:
        Hlt     IO                   ; If Reselection phase interrupt uP and halt
        Ld      SCSI,Bsy             ; Set Bsy bit in register (not on bus yet)
        Ld      CMD,Enable+Dir_In    ; Enable SCSI bus to assert Busy
        Ld      Buf_Ptr_H,Chk_Host_H    ;
        Ld      Buf_Ptr_L,Chk_Host_L    ;
        Ld      Reload_Code          ; Load the code to check the host ID
;******************************************************************************
```

1.13.2. Section #2 - Checking Host Queue parameters

```
;******************************************************************************
;* Check to see if a command from this host can be brought in (queueing)
;******************************************************************************
Chk_Host:
        Ld      GPR,Our_ID*          ; Load the complement of our ID to see if
                                     ;   ANY Host ID is present
        Hlt     Test_For_0           ; If no Host ID, halt and interrupt uP.
        Br      Flag3*,Continue_Chk  ; If Flag3 is set, the queue is full so
        Br      Uncond,Dont_Queue    ; input messages but not command.

Continue_Chk:
        Ld      GPR,Qing_Hosts       ; Check to see if ok to bring in command
        Br      Cmd_Pending*,Chk_Msgs ; Are there any commands pending?

;*********
;   Check messages (queue NOT available)
;*********
Dont_Queue:
        Br      Atn*,Gen_Bsy_Status; If the host doesn't want to send a message
                                   ; then issue Busy Status.
```

```
            Ld    Buf_Ptr_L,Dont_Queue_L  ;
            Ld    Buf_Ptr_H,Dont_Queue_H  ;
            Ld    Reload_Code             ; Get the "Don't Queue" code.

Gen_Bsy_Status:
            Ld    Buf_Ptr_L,Gen_Bsy_Status_L    ;
            Ld    Buf_Ptr_H,Gen_Bsy_Status_H    ;
            Ld    Reload_Code             ; Go generate Busy Status.

;*********
;   Check messages (queue available)
;*********
Chk_Msgs:
            Hlt   Atn*                    ; If Atn set, get the message byte(s).
                                          ; No Identify message, no disconnect allowed Ld    Buf_Ptr_L,Get_Msgs_L;   Load the code to Get the messages
            Ld    Buf_Ptr_H,Get_Msgs_H;
            Ld    Reload_Code             ;

;**********************************************************************
```

1.13.3. Section #3 - Getting Messages (Queue)

```
;**********************************************************************
;* Get any messages from Host given there is a queue location available.
;**********************************************************************

Get_Messages:
            Ld    Restore_Buf_Ptr         ; Get the command buffer pointer back
            Ld    CMD,Enable+ST_F+Dir_In; Get the FIFO ready to transfer
            Ld    D_Input_to_FIFO         ; Put Host SCSI ID in FIFO
            Ld    SCSI,Msg_Out+Bsy        ; Set message out phase
            Wt    1                       ; Get the first message Ld    GPR,Identify_Msg        ; Prepare to check the first message for
                                          ;   Identify
            Hlt   Test_for_0              ; If bit 7 is 0, this message is not an
                                          ;   Identify message - no disconnect
Chk_Dis:
            Ld    GPR,Disconnect_bit      ; See if disconnect supported
            Hlt   Test_for_0              ; If disconnect supported, get second Msg Msg_2:
            Br    Atn*,Chk_Prty           ; If Atn is not set, check parity error
            Wt    1                       ; Get the second message Ld    GPR,Head_of_Q_msg       ; See if it's a Head of Queue tag message
            Br    Compare,Msg_3           ; If Head of Queue msg, get next msg
            Ld    GPR,Unordered_Q_msg;    See if Unordered Queue message
            Br    Compare,Msg_3           ; If Unordered Queue msg, get next msg
            Ld    GPR,Ordered_Q_msg       ; See if Ordered Queue message
            Hlt   Compare*                ; If not an Ordered Queue msg, Halt
Msg_3:
            Hlt   Atn*                    ; If Atn is not set, halt (no tag value)

Get_Msg_3:
            Wt    1                       ; Get the third message

Ld    D_Input_to_FIFO         ; Put last byte into FIFO before flushing

Chk_Atn_3:
            Hlt   Atn                     ; If Attention set, Halt
```

```
Chk_Prty:
        Hlt  Parity_Err          ;

Ld   CMD,Enable+ST_F*+Dir_In; Flush the FIFO
        Wt   FIFO_Free,20us       ; Wait up to 20us for FIFO to empty
        Ld   Buf_Ptr_H,Get_CDB_H;
        Ld   Buf_Ptr_L,Get_CDB_L;
        Ld   Reload_Code          ; Load code to get the CDB
;****************************************************************************
```

1.13.4. Section #4 - Decode and Input CDB

```
;****************************************************************************
;* Get the command descriptor block
;****************************************************************************

Get_CDB:
        Ld   Restore_B_Ptr       ; Get the buffer pointer back
        Ld   CMD,Enable+ST_F+Dir_Out; Prepare to bring in data from buffer.
        Wt   FIFO_E*,10us         ; Wait for the data to come into the FIFO.
        Wt   FIFO_Inc,4           ; Increment the FIFO pointer 4 places.

Ld   CMD,Enable+ST_F+Dir_In; Get the FIFO ready to bring in data.
        Ld   SCSI,Cmd_Phase+Bsy;  Go to Command Phase Wt   1                    ; Get the first command
        Ld   D_Input_to_CMD_Byte  ; Put the command byte in decode location
        Hlt  Undef_GC_or_PE       ; Set an error if command byte is of
                                  ;  an undefined group code or there was a
                                  ;  SCSI bus parity error
        Wt   All_CDB_Input        ; Get all the Command Descriptor block
        Ld   D_Input_to_FIFO      ; Put last byte into FIFO before flushing
        Ld   CMD,Enable+ST_F*     ; Don't transfer any more automatically,
                                  ;  flush the FIFO to buffer
        Hlt  Parity_Err           ; If parity error on CDB, halt
Disconnect:
        Hlt  Atn                  ; If Attention is set, Interrupt and halt
Send_Disc_Msg:
        Ld   CMD,Enable+Dir_Out
        Ld   GPR,Disc_Msg         ; Put Disconnect message on bus
        Ld   SCSI,Bsy+Msg_In      ; Set Message In phase
        Wt   1                    ; Send the message Go_to_Bus_Free:
        Hlt  Atn                  ; If no Atn, set bus free Set_Bus_Free:
        Br   Dec_LC_JNZ,Load_Begin; If all command buffers aren't full, loop
        Ld   Set_Flag3            ; Set Flag3 indicating command buffers full Wt   FIFO_Free,20us       ; Wait for the FIFO to be put into buffer
        Ld   CMD,Enable*+LC2      ; Disable SCSI data bus signals, flush FIFO
Load_Begin:
        Ld   Save_B_Ptr           ; Save the command buffer pointer for now
        Ld   Buf_Ptr_H,Begin_Code_H ;
        Ld   Buf_Ptr_L,Begin_Code_L ;
        Ld   Reload_Code          ; Get the Beginning code back in.
;****************************************************************************
```

1.13.5. Section #5 - Getting Messages (No Queue)

```
;***********************************************************************
;* Get any messages from Host given NO queue location is available.
;***********************************************************************

Get_Messages:
        Ld      Restore_Buf_Ptr    ; Get the command buffer pointer back
        Ld      CMD,Enable+ST_F+Dir_In; Get the FIFO ready to transfer
        Ld      D_Input_to_FIFO    ; Put Host SCSI ID in FIFO
        Ld      SCSI,Msg_Out+Bsy   ; Set message out phase
        Wt      1                  ; Get the first message Ld      GPR,Identify_Msg   ; Prepare to check the first message for
                                   ;  Identify
        Hlt     Test_for_0         ; If bit 7 is 0, this message is not an
                                   ;  Identify message - no disconnect
Chk_Dis:
        Ld      GPR,Disconnect_bit ; See if disconnect supported
        Hlt     Test_for_0         ; If disconnect supported, get second Msg Msg_2:
        Br      Atn*,Chk_Prty      ; If Atn is not set, check parity error
        Wt      1                  ; Get the second message Ld      GPR,Head_of_Q_msg  ; See if it's a Head of Queue tag message
        Br      Compare,Msg_3      ; If Head of Queue msg, get next msg
        Ld      GPR,Unordered_Q_msg; See if Unordered Queue message
        Br      Compare,Msg_3      ; If Unordered Queue msg, get next msg
        Ld      GPR,Ordered_Q_msg  ; See if Ordered Queue message
        Hlt     Compare*           ; If not an Ordered Queue msg, Halt
Msg_3:
        Hlt     Atn*               ; If Atn is not set, halt (no tag value)

Get_Msg_3:
        Wt      1                  ; Get the third message

Ld      D_Input_to_FIFO    ; Put last byte into FIFO before flushing

Chk_Atn_3:
        Hlt     Atn                ; If Attention set, Halt
Chk_Prty:
        Hlt     Parity_Err         ;

Ld      CMD,Enable+ST_F*+Dir_In; Flush the FIFO
        Wt      FIFO_Free,20us     ; Wait up to 20us for FIFO to empty
        Ld      Buf_Ptr_H,Get_CDB_H;
        Ld      Buf_Ptr_L,Get_CDB_L;
        Ld      Reload_Code        ; Load code to get the CDB
;***********************************************************************
```

1.13.6. Section #6 - Send Busy Status

```
;***********************************************************************
Send_Bsy_Status:
        Ld      SCSI,Status_Phase  ; Put bus into Status phase
        Ld      CMD,Enable+Dir_Out ; Send data to Host
        Ld      GPR,Bsy_Status     ; Send Busy Status
        Wt      1                  ; Send the message
        Ld      SCSI,Bsy+Msg_In    ; Set Message In phase
        Ld      GPR,Command_Complete; Send Command complete message
        Wt      1

Br      Atn*,Go_to_Bus_Free; Go back to be selected
```

```
        Ld    Stat_Code,Atn_after_msg;  Set Status code register to halt with
                                      ;  a code indicating that the host had Atn
                                      ;  set after the last message
Go_to_Bus_Free:
        Ld    CMD,Enable*             ; Bus Free Ld    Buf_Ptr_H,Begin_Code_H  ;
        Ld    Buf_Ptr_L,Begin_Code_L  ;
        Ld    Reload_Code             ; Get the Beginning code back in.
;***************************************************************************
```

1.13.7. Section #7 - Reconnect and transfer messages

To cause the sequencer to reconnect and transfer data the microprocessor must set up the "Data Transfer Overlay" with the proper buffer pointer value, the proper code for transferring to or from the Initiator, and the disconnect or command complete sequences. Once this has been done, the microprocessor can directly write the "Clear Flag0" macro command to allow the sequencer to perform the reconnect-and-transfer-data process.

```
;***************************************************************************
;* This is the beginning of the code to send or receive data to/from the host.
;* It will be loaded after a successful reconnect to the host has been done.
;* The code will also send the appropriate reconnect messages (preset by the
;* microprocessor) before sending or receiving the data.
;***************************************************************************

Select_Host:
        Wt    1000ns                   ; Wait 1200 ns after asserting Select
        Ld    GPR,Our_ID+Init_ID       ; Assert our ID and initiator's ID
        Ld    SCSI,Msg_In+Bsy+Sel;     Set to message in phase
        Ld    SCSI,Msg_In+Sel          ; Release Busy line
        Wt    400ns                    ; Wait for bus settle delay
        Wt    Bsy,250ms                ; Wait for 250ms selection time-out
        Ld    SCSI,Msg_In+Bsy+Sel;     Assert Busy
        Ld    SCSI,Msg_In+Bsy          ; Release Select line Ld    SC_Reg,#Reconnected;     Indicate that the reconnect was done ;***************************************************************************
;* Send the reconnect sequence of messages, in this case, Identify and any
;* Queue Tag messages
;***************************************************************************

Send_Messages:
        Ld    Bfr_Ptr_L,(Msg_L)        ; Get Buffer pointer location
        Ld    Bfr_Ptr_H,(Msg_H)        ;  "       "        "       "
        Ld    CMD,Enable+ST_F+Dir_In   ; Get the FIFO ready to transfer
        Wt    FIFO_E*,20us             ; Wait for the FIFO to fill
        Ld    FIFO_to_GPR              ; Get the first byte from FIFO to GPR
        Hlt   Parity_Err               ; Halt if there is a Parity Error
        Wt    Num_Msgs                 ; Send the messages
        Ld    CMD,Enable+Dir_In        ; Stop the auto handshake, ST_F*

Hlt   Atn                      ; If attention line is active, go tell uP

Ld    Buf_Ptr_H,Data_Code_H    ;
        Ld    Buf_Ptr_L,Data_Code_L    ;
        Ld    Reload_Code              ; Get the code to send or receive data.
;***************************************************************************
```

1.13.8. Section #8 - Send or Receive data

Sending or receiving data is done by setting up the starting buffer RAM pointers, setting the number of blocks to transfer in Loop Counter 1, and setting the direction bit appropriately. There are only 4 instructions that need to be different (modified) for either the sending or receiving of data (shown here with line numbers and columnized instructions for sending or receiving data).

After the data is sent or received, the sequencer waits for Flag1 to be cleared. At this point the microprocessor may:
  a) load the Buffer Pointer and Loop Count values and restart from the data transfer section ("First_Data") OR
  b) load the Disconnect message and return to the "top" OR
  c) load the Status and Message byte sequence and return to the "top".

Instead of using only this one loop, it is possible to link together a variety of sequences which would force the sequencer to reload for each different function. This may be more time consuming but would be easier to program because each sequence would have a particular function. For example: the microprocessor wants to transfer 3 non-contiguous sections of data to the host, followed by the Status and Message bytes. Solution: three identical data sequences with only the Buffer Pointer, Loop Counter, and reload values different, could be set up and simply linked together. The last link would load in the Status and Message code.

```
;****************************************************************************
;    Send data to Host                        Receive data from Host
;
           Ld   Set_Flag0            ; Indicate not to exit routine.
Wait_for_data:
           Wt   Flag1*,No_T_Out      ; Wait for the microprocessor (no time out).
Load_Data_Info:
           Ld   Bfr_Ptr_L,Data_L     ; Get data location
           Ld   Bfr_Ptr_H,Data_H     ;  "    "      "
           Ld   Loop_Count,Num_Blocks; Get ready to transfer the data
           Ld   Set_Flag1            ; Notify the microprocessor that the Buffer
                                     ; Pointer and Loop Count values have been
                                     ; input and may be updated for next sequence 1    Ld   SCSI,Bsy+Data Out                   Ld SCSI,Bsy+Data In First_Data:

2    Ld   CMD,Enable+ST F+Dir from Mem    Ld   CMD,Enable+ST F+Dir to Mem
3    Wt   FIFO E*,20us                    Ld   Nop
4    Ld   FIFO to GPR                     Ld   Nop Data_Loop:
           Wt   Block_Size
           Br   Decr_LC_BNZ,Data_Loop; Loop until all blocks are transferred
Data_End:
           Wt   Sync_Empty           ; Wait for sync pipe to empty - waits for
                                     ; synchronous Ack's to catch up to Req's at
                                     ; end of block transfer. The sync pipe is
                                     ; always empty for asynchronous transfers.
           Ld   CMD,Enable+ST_F*     ; Flush the FIFO
           Wt   FIFO_Free,20us
           Hlt  Parity_Err           ; Halt if a SCSI or FIFO parity err
           Hlt  Atn                  ; Halt if host wants to send message Br   Flag1*,Load_Data_Info; If Flag1 is clear, more data to be sent
           Br   Flag0*,[Send_CMD_CMPLT][Send_Disc_Msg]; If Flag0 is clear, exit
No_Data:
           Ld   Set_Flag2            ; Indicate that loop count exhausted
           Br   Uncond,Wait_for_data
```

```
Send_Disc_Msg:
        Ld      Clr_Flag0               ; Don't reconnect automatically.
        Ld      Buf_Ptr_H,Send_Disc_Code_H      ;
        Ld      Buf_Ptr_L,Send_Disc_Code_L      ;
        Ld      Reload_Code             ; Go send the disconnect message.

Send_CMD_CMPLT:
        Ld      Clr_Flag0               ; Don't reconnect automatically.
        Ld      Buf_Ptr_H,CMD_CMPLT_Code_H      ;
        Ld      Buf_Ptr_L,CMD_CMPLT_Code_L      ;
        Ld      Reload_Code             ; Go do the appropriate thing.
;****************************************************************************
```

1.13.9. Section #9 - Send Disconnect Message

```
;****************************************************************************
Send_Disc_Msg:
        Ld      CMD,Enable+Dir_Out
        Ld      GPR,Disc_Msg            ; Put Disconnect message on bus
        Ld      SCSI,Bsy+Msg_In         ; Set Message In phase
        Wt      1                       ; Send the message Hlt     Atn                     ; If no Atn, set bus free Ld      CMD,Enable*             ; Go to Bus Free
        Ld      Buf_Ptr_H,Begin_Code_H  ;
        Ld      Buf_Ptr_L,Begin_Code_L  ;
        Ld      Reload_Code             ; Go to the beginning.

;****************************************************************************
```

1.13.10. Section #10 - Send Status and Message

```
;****************************************************************************
Send_St_and_Msg:
        Ld      SCSI,Status_Phase       ; Put bus into Status phase
        Ld      CMD,Enable+Dir_Out      ; Send data to Host
        Ld      GPR,Status              ; Send status
        Wt      1                       ; Send the message
        Ld      SCSI,Bsy+Msg_In         ; Set Message In phase
        Ld      GPR,Command_Complete    ; Send Command complete message
        Wt      1

Br      Atn*,Go_to_Bus_Free     ; Go back to be selected

Ld      Stat_Code,Atn_after_msg ; Set Status code register to halt with
                                        ; a code indicating that the host had Atn
                                        ; set after the last message
Go_to_Bus_Free:
        Ld      CMD,Enable*             ; Bus Free Ld      Buf_Ptr_H,Begin_Code_H  ;
        Ld      Buf_Ptr_L,Begin_Code_L  ;
        Ld      Reload_Code             ; Get the Beginning code back in.
;****************************************************************************
```

What is claimed is:

1. A sequencer for controlling interfacing between a host computer, a magnetic disk-drive, and a buffer memory, comprising:
   means for receiving a plurality of blocks of SCSI data micro-instructions;
   means for receiving a plurality of blocks of host computer micro-instructions;
   a buffer memory for storing a plurality of blocks of micro-instructions;
   means for selecting a first block of micro-instructions, said first block selected from the group of instructions consisting of said blocks of SCSI data micro-instructions and said blocks of host computer micro-instructions;
   a register file for storing said first block of micro-instructions;
   means for indicating a first micro-instruction of said first micro-instruction block, said first micro-instruction selected from the group consisting of branch instructions, wait instructions, macro instructions and load instructions;
   said branch instructions having a first condition and a branch destination, said wait instructions having a wait time period, said macro instructions for performing custom instructions, said load instructions for loading a plurality registers in said sequencer, said load instructions including reload instructions for loading a new block of micro-instructions into said register file;
   branching means whereby upon a branch instruction, said branching means checks said first condition, and if satisfied causes said indicating means to indicate said branch destination;
   waiting means whereby upon a wait instruction, said waiting means loops until said wait time period indicated by said wait instruction has expired;
   means for executing said first micro-instruction;
   incrementing means for incrementing said indicating means to indicate a next micro-instruction if no branch has occurred; and
   means for looping whereby said indicating means will be incremented upon the execution of a micro-instruction and thereby indicate a next instruction for execution, whereby said incrementing means and said executing means will continue to loop until a first reload instruction is indicated, said reload instruction for selecting a second block of micro-instructions from said selected one of said group of micro-instructions.

2. The sequencer of claim 1 including FIFO register means for temporarily storing said second block of micro-instructions prior to said second block of micro-instructions being loaded into said register file from said selected one of said group of micro-instructions.

3. The sequencer of claim 2 including second multiplexer means for selectively directing to said FIFO register said buffer memory micro-instructions or said host computer micro-instructions.

4. The sequencer of claim 2 including data input register means for storing said host computer micro-instructions.

5. The sequencer of claim 4 including third multiplexer means for selectively directing output signals from said FIFO register means or output signals from a sequencer control register to a host computer output bus.

6. The sequencer of claim 1 including first multiplexing means for selectively directing to one or more control registers either micro-instructions from output terminals of said register file or micro-instructions at input terminals to said register file.

7. The sequencer of claim 1 including means for loading a write pointer address for said register file into a write-pointer address register.

8. A method for reloading blocks of micro-instructions to a register file in a sequencer for controlling interfacing between a host computer, a magnetic disk-drive, and a buffer memory, comprising the steps of:
   providing means for receiving a plurality of blocks of SCSI data micro-instructions;
   providing means for receiving a plurality of blocks of host computer micro-instructions;
   storing a plurality of blocks of micro-instructions in said buffer memory from the group selected from said blocks of SCSI data micro-instructions and said host computer micro-instructions;
   storing a first block of micro-instructions from said plurality of blocks of micro-instructions in a register file;
   providing means for indicating a first micro-instruction of said first micro-instruction block, said first micro-instruction selected from the group consisting of branch instructions, wait instructions, macro instructions and load instructions;
   said branch instructions having a first condition and a branch destination, said wait instructions having a wait time period, said macro instructions for performing custom instructions, said load instructions for loading a plurality of registers in said sequencer, said load instructions including reload instructions for loading a new block of micro-instructions into said register file;
   providing means for branching whereby upon a branch instruction, said branching means checks said first condition, and if satisfied, causes said indicating means to indicate said branch destination;
   providing waiting means whereby upon a wait instruction, said waiting means loops until said wait time period indicated by said wait instruction has expired;
   executing said first micro-instruction;
   if no branch has occurred, incrementing said indicating means to indicate a next micro-instruction;
   executing said next micro-instruction;
   repeating said incrementing said indicating means step and said executing said next micro-instruction step until a first reload instruction is indicated;
   calling a second block of micro-instructions from said selected one of said group using said first reload instruction contained within said first block of micro-instructions; and
   loading said second block of micro-instructions into said register file, said second block of micro-instructions containing micro-instructions for loading a third block of micro-instructions into said register file.

9. The method of claim 8 including the step of supplying said first micro-instruction from a plurality of output terminals of said register file to a first one or more control registers of said sequencer.

10. The method of claim 9 including the step of selectively directing with a multiplexer to one or more of said control registers either the micro-instructions from said output terminals of said register file or a fourth block of micro-instructions from said host computer.

11. The method of claim 8 wherein the step of storing a first block of micro-instructions includes the step of loading a write pointer address for said register file into a write-pointer address register.

12. The method of claim 8 including the step of temporarily storing said second block of micro-instructions in a FIFO register prior to said second block of micro-instructions being loaded into said register file from said one of said selected group.

13. The method of claim 8 wherein the step of providing means for receiving a plurality of blocks of SCSI data micro-instructions includes the step of storing in a data input register the SCSI data micro-instructions.

14. The method of claim 8 including the step of selectively directing output signals from said register file or output signals from a sequencer control register to a host computer output bus.

15. The method of claim 8 wherein said wait instruction includes a second condition whereby upon a wait instruction said waiting means loops until said second condition is satisfied, if said second condition is not satisfied by said wait time period indicated by said wait instruction, then said wait means provides a first hold signal to said host computer.

* * * * *